United States Patent
McCarthy et al.

(10) Patent No.: US 12,432,242 B1
(45) Date of Patent: Sep. 30, 2025

(54) ANOMALY DETECTION IN MANAGED NETWORKS

(71) Applicant: strongDM, Inc., Palo Alto, CA (US)

(72) Inventors: Justin Allan McCarthy, Redwood City, CA (US); Ravi Dilip Patel, Pflugerville, TX (US); Jess Henry Schmidt, Albert Lea, MN (US)

(73) Assignee: strongDM, Inc., Palo Alto, CA (US)

( * ) Notice: Subject to any disclaimer, the term of this patent is extended or adjusted under 35 U.S.C. 154(b) by 0 days.

(21) Appl. No.: 19/094,182

(22) Filed: Mar. 28, 2025

(51) Int. Cl.
*H04L 9/40* (2022.01)

(52) U.S. Cl.
CPC .............................. *H04L 63/1425* (2013.01)

(58) Field of Classification Search
CPC ............... H04L 67/535; H04L 63/1416; H04L 63/1433; H04L 63/1425; G06F 21/577
See application file for complete search history.

(56) References Cited

U.S. PATENT DOCUMENTS

| | | |
|---|---|---|
| 5,867,494 A | 2/1999 | Krishnaswamy et al. |
| 5,867,495 A | 2/1999 | Elliott et al. |
| 5,884,794 A | 3/1999 | Calhoun et al. |
| 5,987,247 A | 11/1999 | Lau |
| 6,335,927 B1 | 1/2002 | Elliott et al. |
| 6,345,386 B1 | 2/2002 | Delo et al. |
| 6,418,447 B1 | 7/2002 | Frey et al. |
| 6,418,554 B1 | 7/2002 | Delo et al. |
| 6,442,564 B1 | 8/2002 | Frey et al. |
| 6,463,470 B1 | 10/2002 | Mohaban et al. |
| 6,466,932 B1 | 10/2002 | Dennis et al. |

(Continued)

FOREIGN PATENT DOCUMENTS

| | | |
|---|---|---|
| CA | 2847507 A1 | 11/2014 |
| EP | 3422236 B1 | 6/2022 |

OTHER PUBLICATIONS

Zhang et al., "Time Series Anomaly Detection via Reinforcement Learning-Based Model Selection," 2022 IEEE Canadian Conference on Electrical and Computer Engineering (CCECE) Year: 2022 | Conference Paper | Publisher: IEEE.*

(Continued)

*Primary Examiner* — Roderick Tolentino
(74) *Attorney, Agent, or Firm* — John W. Branch; Branch Partners PLLC

(57) ABSTRACT

Embodiments detect anomalous activity in networks. Events may be generated based on an activity observed in a monitored network such that each event includes values associated with the activity. High dimensional event vectors may be generated by embedding based on the events and the values included in each event. Anomalous events may be determined based on detection models trained with a cluster of events associated with the high dimensional event vectors such that each anomalous event may correspond to a high dimensional event vector compared to conditions declared in the detection models and such that each anomalous event may be associated with a priority score or a confidence score. A user interface that displays a report that includes the anomalous events may be generated and arranged based on the priority score, the confidence score, a user selected preference, feedback metrics associated with the user interface, or the like.

30 Claims, 17 Drawing Sheets

(56) References Cited

U.S. PATENT DOCUMENTS

| | | |
|---|---|---|
| 6,502,103 B1 | 12/2002 | Frey et al. |
| 6,505,210 B1 | 1/2003 | Frey et al. |
| 6,523,166 B1 | 2/2003 | Mishra et al. |
| 6,553,384 B1 | 4/2003 | Frey et al. |
| 6,560,609 B1 | 5/2003 | Frey et al. |
| 6,567,818 B1 | 5/2003 | Frey et al. |
| 6,594,671 B1 | 7/2003 | Aman et al. |
| 6,836,794 B1 | 12/2004 | Lucovsky et al. |
| 6,909,708 B1 | 6/2005 | Krishnaswamy et al. |
| 7,165,107 B2 | 1/2007 | Pouyoul et al. |
| 7,174,361 B1 | 2/2007 | Paas |
| 7,233,569 B1 | 6/2007 | Swallow |
| 7,752,466 B2 | 7/2010 | Ginter et al. |
| 7,752,487 B1 | 7/2010 | Feeser et al. |
| 7,788,399 B2 | 8/2010 | Brouk et al. |
| 7,797,406 B2 | 9/2010 | Patel et al. |
| 7,882,247 B2 | 2/2011 | Sturniolo et al. |
| 7,886,339 B2 | 2/2011 | Keohane et al. |
| 8,102,814 B2 | 1/2012 | Rahman et al. |
| 8,135,815 B2 | 3/2012 | Mayer |
| 8,165,905 B2 | 4/2012 | Yamamoto |
| 8,656,154 B1 | 2/2014 | Kailash et al. |
| 8,656,478 B1 | 2/2014 | Forristal |
| 8,806,593 B1 | 8/2014 | Raphel et al. |
| 8,817,668 B2 | 8/2014 | Sekaran et al. |
| 8,869,259 B1 | 10/2014 | Udupa et al. |
| 9,002,805 B1 | 4/2015 | Barber et al. |
| 9,026,079 B2 | 5/2015 | Raleigh et al. |
| 9,052,942 B1 | 6/2015 | Barber et al. |
| 9,063,946 B1 | 6/2015 | Barber et al. |
| 9,082,402 B2 | 7/2015 | Yadgar et al. |
| 9,176,758 B2 | 11/2015 | Swaminathan |
| 9,178,793 B1 | 11/2015 | Marlow |
| 9,185,082 B2 | 11/2015 | Dashora et al. |
| 9,239,834 B2 | 1/2016 | Donabedian et al. |
| 9,300,635 B2 | 3/2016 | Gilde et al. |
| 9,344,509 B1 * | 5/2016 | Serboncini ............ H04L 67/535 |
| 9,355,060 B1 | 5/2016 | Barber et al. |
| 9,369,433 B1 | 6/2016 | Paul et al. |
| 9,380,456 B1 | 6/2016 | Lee et al. |
| 9,380,523 B1 | 6/2016 | Mijar et al. |
| 9,380,562 B1 | 6/2016 | Vetter et al. |
| 9,417,917 B1 | 8/2016 | Barber et al. |
| 9,471,775 B1 | 10/2016 | Wagner et al. |
| 9,491,157 B1 | 11/2016 | Amdahl et al. |
| 9,521,115 B1 | 12/2016 | Woolward |
| 9,560,081 B1 | 1/2017 | Woolward |
| 9,584,523 B2 | 2/2017 | Santhiveeran |
| 9,619,673 B1 | 4/2017 | Vetter et al. |
| 9,632,828 B1 | 4/2017 | Mehta et al. |
| 9,658,983 B1 | 5/2017 | Barber et al. |
| 9,667,703 B1 | 5/2017 | Vetter et al. |
| 9,697,629 B1 | 7/2017 | Vetter et al. |
| 9,727,522 B1 | 8/2017 | Barber et al. |
| 9,729,581 B1 | 8/2017 | Skene et al. |
| 9,762,619 B1 | 9/2017 | Vaidya et al. |
| 9,787,639 B1 | 10/2017 | Sun et al. |
| 9,800,517 B1 | 10/2017 | Anderson |
| 9,819,593 B1 | 11/2017 | Vetter et al. |
| 9,825,911 B1 | 11/2017 | Brandwine |
| 9,882,767 B1 | 1/2018 | Foxhoven et al. |
| 9,948,644 B2 | 4/2018 | Brouk et al. |
| 10,033,766 B2 | 7/2018 | Gupta et al. |
| 10,063,595 B1 | 8/2018 | Qureshi et al. |
| 10,075,334 B1 | 9/2018 | Kozura et al. |
| 10,089,476 B1 | 10/2018 | Roth et al. |
| 10,104,185 B1 | 10/2018 | Sharifi et al. |
| 10,110,593 B2 | 10/2018 | Karroumi et al. |
| 10,116,679 B1 | 10/2018 | Wu et al. |
| 10,117,098 B1 | 10/2018 | Naguthanawala et al. |
| 10,154,065 B1 | 12/2018 | Buchler et al. |
| 10,158,545 B1 | 12/2018 | Marrone et al. |
| 10,292,033 B2 | 5/2019 | Beyer et al. |
| 10,348,767 B1 | 7/2019 | Lee et al. |
| 10,360,010 B1 | 7/2019 | Maehler et al. |
| 10,361,859 B2 | 7/2019 | Clark et al. |
| 10,382,401 B1 | 8/2019 | Lee et al. |
| 10,395,042 B2 | 8/2019 | Agarwal et al. |
| 10,409,582 B1 | 9/2019 | Maehler et al. |
| 10,476,745 B1 | 11/2019 | McCormick et al. |
| 10,505,989 B2 | 12/2019 | Hankins et al. |
| 10,511,590 B1 | 12/2019 | Bosch et al. |
| 10,511,614 B1 | 12/2019 | Aziz |
| 10,516,667 B1 | 12/2019 | Roth et al. |
| 10,579,362 B1 | 3/2020 | Maehler et al. |
| 10,579,403 B2 | 3/2020 | Antony et al. |
| 10,587,621 B2 | 3/2020 | Ponnuswamy et al. |
| 10,587,644 B1 | 3/2020 | Stolte et al. |
| 10,609,041 B1 | 3/2020 | Wilczynski et al. |
| 10,645,562 B2 | 5/2020 | Beyer et al. |
| 10,659,533 B1 | 5/2020 | Zhao et al. |
| 10,728,117 B1 | 7/2020 | Sharma et al. |
| 10,735,263 B1 | 8/2020 | Mcalary et al. |
| 10,764,244 B1 | 9/2020 | Mestery et al. |
| 10,827,020 B1 | 11/2020 | Cao et al. |
| 10,917,438 B2 | 2/2021 | Gandham et al. |
| 10,944,691 B1 | 3/2021 | Raut et al. |
| 10,958,649 B2 | 3/2021 | Delcourt et al. |
| 10,999,326 B1 | 5/2021 | Pollitt et al. |
| 11,038,861 B2 | 6/2021 | Agarwal et al. |
| 11,070,594 B1 | 7/2021 | Marrone et al. |
| 11,075,747 B1 | 7/2021 | Holsman |
| 11,075,923 B1 | 7/2021 | Srinivasan et al. |
| 11,089,047 B1 | 8/2021 | Kaushal et al. |
| 11,102,076 B1 | 8/2021 | Pieczul et al. |
| 11,102,147 B2 | 8/2021 | Mehta et al. |
| 11,153,190 B1 | 10/2021 | Mahajan et al. |
| 11,163,614 B1 | 11/2021 | Francisco |
| 11,228,945 B2 | 1/2022 | Yang et al. |
| 11,233,872 B2 | 1/2022 | Shribman et al. |
| 11,249,809 B1 | 2/2022 | Tang et al. |
| 11,290,143 B1 | 3/2022 | Sternowski |
| 11,303,643 B1 | 4/2022 | Li et al. |
| 11,310,650 B2 | 4/2022 | Zhau |
| 11,316,822 B1 | 4/2022 | Gawade et al. |
| 11,323,919 B1 | 5/2022 | Parulkar et al. |
| 11,375,300 B2 | 6/2022 | Sagie et al. |
| 11,412,051 B1 | 8/2022 | Chiganmi et al. |
| 11,424,946 B2 | 8/2022 | Shribman et al. |
| 11,431,497 B1 | 8/2022 | Liguori et al. |
| 11,483,308 B2 | 10/2022 | Kale et al. |
| 11,502,908 B1 | 11/2022 | Singh |
| 11,521,444 B1 | 12/2022 | Badik et al. |
| 11,528,147 B2 | 12/2022 | Madisetti et al. |
| 11,538,287 B2 | 12/2022 | Fang et al. |
| 11,546,323 B1 | 1/2023 | Jones et al. |
| 11,546,763 B1 | 1/2023 | Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 11,632,669 B2 | 4/2023 | Xu et al. |
| 11,657,145 B2 | 5/2023 | Cristina et al. |
| 11,729,620 B1 | 8/2023 | Filho et al. |
| 11,736,531 B1 | 8/2023 | Filho et al. |
| 11,765,159 B1 | 9/2023 | Crawford et al. |
| 11,765,207 B1 | 9/2023 | McCarthy et al. |
| 11,784,999 B1 | 10/2023 | Jones et al. |
| 11,831,511 B1 | 11/2023 | Zhou et al. |
| 11,861,221 B1 | 1/2024 | Richardson et al. |
| 11,916,885 B1 | 2/2024 | Cirello Filho et al. |
| 11,916,968 B1 | 2/2024 | Cirello Filho et al. |
| 11,930,045 B1 | 3/2024 | Baker et al. |
| 11,954,219 B1 | 4/2024 | Makmal et al. |
| 11,973,752 B2 | 4/2024 | Crawford et al. |
| 12,028,321 B1 | 7/2024 | Cirello Filho et al. |
| 12,063,148 B2 | 8/2024 | Dabell et al. |
| 12,063,218 B2 | 8/2024 | Wilczynski et al. |
| 12,063,550 B2 | 8/2024 | Qiao et al. |
| 12,177,097 B2 | 12/2024 | Gupta et al. |
| 12,184,667 B2 | 12/2024 | Chacko |
| 12,184,700 B2 | 12/2024 | Raleigh |
| 12,238,119 B1 * | 2/2025 | Chivu ............ H04L 41/16 |
| 12,242,599 B1 | 3/2025 | Hassey et al. |
| 12,284,224 B1 | 4/2025 | Cirello Filho et al. |

(56) References Cited

U.S. PATENT DOCUMENTS

| | | |
|---|---|---|
| 12,348,519 B1 | 7/2025 | Hassey et al. |
| 12,355,770 B2 | 7/2025 | Cirello Filho et al. |
| 2002/0099952 A1 | 7/2002 | Lambert et al. |
| 2002/0124144 A1 | 9/2002 | Gharachorloo et al. |
| 2002/0133534 A1 | 9/2002 | Forslow |
| 2002/0140738 A1 | 10/2002 | West et al. |
| 2002/0149623 A1 | 10/2002 | West et al. |
| 2003/0041141 A1 | 2/2003 | Abdelaziz et al. |
| 2003/0058286 A1 | 3/2003 | Dando |
| 2003/0093465 A1 | 5/2003 | Banerjee et al. |
| 2003/0145317 A1 | 7/2003 | Chamberlain |
| 2003/0177182 A1 | 9/2003 | Clark et al. |
| 2004/0019898 A1 | 1/2004 | Frey et al. |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0088348 A1 | 5/2004 | Yeager et al. |
| 2004/0133640 A1 | 7/2004 | Yeager et al. |
| 2004/0184070 A1 | 9/2004 | Kiraly et al. |
| 2005/0022185 A1 | 1/2005 | Romero |
| 2005/0132227 A1 | 6/2005 | Reasor et al. |
| 2005/0164650 A1 | 7/2005 | Johnson |
| 2005/0209876 A1 | 9/2005 | Kennis et al. |
| 2006/0074876 A1 | 4/2006 | Kakivaya et al. |
| 2006/0136928 A1 | 6/2006 | Crawford et al. |
| 2006/0177005 A1 | 8/2006 | Shaffer et al. |
| 2006/0177024 A1 | 8/2006 | Frifeldt et al. |
| 2006/0177025 A1 | 8/2006 | Frifeldt et al. |
| 2006/0190991 A1 | 8/2006 | Iyer |
| 2006/0200856 A1 | 9/2006 | Salowey et al. |
| 2006/0212487 A1 | 9/2006 | Kennis et al. |
| 2006/0233166 A1 | 10/2006 | Bou-Diab et al. |
| 2006/0233180 A1 | 10/2006 | Serghi et al. |
| 2006/0235973 A1 | 10/2006 | McBride et al. |
| 2006/0240824 A1 | 10/2006 | Henderson et al. |
| 2006/0265708 A1 | 11/2006 | Blanding et al. |
| 2006/0265758 A1 | 11/2006 | Khandelwal et al. |
| 2006/0288204 A1 | 12/2006 | Sood et al. |
| 2007/0009104 A1 | 1/2007 | Renkis |
| 2007/0014413 A1 | 1/2007 | Oliveira et al. |
| 2007/0033273 A1 | 2/2007 | White et al. |
| 2007/0124797 A1 | 5/2007 | Gupta et al. |
| 2007/0162359 A1 | 7/2007 | Gokhale et al. |
| 2007/0220009 A1 | 9/2007 | Morris et al. |
| 2007/0293210 A1 | 12/2007 | Strub et al. |
| 2007/0294209 A1 | 12/2007 | Strub et al. |
| 2007/0294253 A1 | 12/2007 | Strub et al. |
| 2008/0072281 A1 | 3/2008 | Willis et al. |
| 2008/0072282 A1 | 3/2008 | Willis et al. |
| 2008/0082823 A1 | 4/2008 | Starrett et al. |
| 2008/0144502 A1 | 6/2008 | Jackowski et al. |
| 2008/0184336 A1 | 7/2008 | Sarukkai et al. |
| 2008/0201454 A1 | 8/2008 | Soffer |
| 2008/0229383 A1 | 9/2008 | Buss et al. |
| 2008/0256357 A1 | 10/2008 | Iyengar et al. |
| 2008/0313699 A1 | 12/2008 | Starostin et al. |
| 2009/0037607 A1 | 2/2009 | Farinacci et al. |
| 2009/0049509 A1 | 2/2009 | Chan et al. |
| 2009/0063381 A1 | 3/2009 | Chan et al. |
| 2009/0083336 A1 | 3/2009 | Srinivasan |
| 2009/0164663 A1 | 6/2009 | Ransom et al. |
| 2009/0216910 A1 | 8/2009 | Duchesneau |
| 2009/0222559 A1 | 9/2009 | Anipko et al. |
| 2010/0037311 A1 | 2/2010 | He et al. |
| 2010/0053676 A1 | 3/2010 | Sugimoto |
| 2010/0131650 A1 | 5/2010 | Pok et al. |
| 2010/0132013 A1 | 5/2010 | Van et al. |
| 2010/0154025 A1 | 6/2010 | Esteve et al. |
| 2010/0161632 A1 | 6/2010 | Rosen |
| 2010/0192212 A1 | 7/2010 | Raleigh |
| 2010/0217853 A1 | 8/2010 | Alexander et al. |
| 2010/0250497 A1 | 9/2010 | Redlich et al. |
| 2010/0262717 A1 | 10/2010 | Critchley et al. |
| 2011/0002333 A1 | 1/2011 | Karuppiah et al. |
| 2011/0106757 A1 | 5/2011 | Pickney et al. |
| 2011/0106770 A1 | 5/2011 | McDonald et al. |
| 2011/0106771 A1 | 5/2011 | McDonald et al. |
| 2011/0106802 A1 | 5/2011 | Pickney et al. |
| 2011/0167474 A1 | 7/2011 | Sinha et al. |
| 2011/0225311 A1 | 9/2011 | Liu et al. |
| 2012/0084438 A1 | 4/2012 | Raleigh et al. |
| 2012/0102050 A1 | 4/2012 | Button et al. |
| 2012/0185913 A1 | 7/2012 | Martinez et al. |
| 2012/0216240 A1 | 8/2012 | Gottumukkala et al. |
| 2012/0240183 A1 | 9/2012 | Sinha |
| 2012/0260307 A1 | 10/2012 | Sambamurthy et al. |
| 2012/0278293 A1 | 11/2012 | Bulkowski et al. |
| 2012/0304265 A1 | 11/2012 | Richter et al. |
| 2013/0031157 A1 | 1/2013 | Mckee et al. |
| 2013/0125112 A1 | 5/2013 | Mittal et al. |
| 2013/0173794 A1 | 7/2013 | Agerbak et al. |
| 2013/0198558 A1 | 8/2013 | Rao et al. |
| 2013/0227714 A1 | 8/2013 | Gula et al. |
| 2013/0239192 A1 | 9/2013 | Linga et al. |
| 2013/0268260 A1 | 10/2013 | Lundberg et al. |
| 2013/0268740 A1 | 10/2013 | Holt |
| 2013/0298183 A1 | 11/2013 | McGrath et al. |
| 2014/0044265 A1 | 2/2014 | Kocher et al. |
| 2014/0057676 A1 | 2/2014 | Lord et al. |
| 2014/0136970 A1 | 5/2014 | Xiao |
| 2014/0183269 A1 | 7/2014 | Glaser |
| 2014/0195818 A1 | 7/2014 | Neumann et al. |
| 2014/0248852 A1 | 9/2014 | Raleigh et al. |
| 2014/0282900 A1 | 9/2014 | Wang et al. |
| 2014/0289794 A1 | 9/2014 | Raleigh et al. |
| 2014/0373124 A1 | 12/2014 | Rubin et al. |
| 2014/0376378 A1 | 12/2014 | Rubin et al. |
| 2015/0063202 A1 | 3/2015 | Mazzarella et al. |
| 2015/0079945 A1 | 3/2015 | Rubin et al. |
| 2015/0082016 A1 | 3/2015 | Bonczkowski et al. |
| 2015/0082374 A1 | 3/2015 | Dobson et al. |
| 2015/0089566 A1 | 3/2015 | Chesla |
| 2015/0089575 A1 | 3/2015 | Vepa et al. |
| 2015/0127949 A1 | 5/2015 | Patil et al. |
| 2015/0128205 A1 | 5/2015 | Mahaffey et al. |
| 2015/0135277 A1 | 5/2015 | Vij et al. |
| 2015/0135300 A1 | 5/2015 | Ford |
| 2015/0143456 A1 | 5/2015 | Raleigh et al. |
| 2015/0143504 A1 | 5/2015 | Desai et al. |
| 2015/0169871 A1 | 6/2015 | Achutha et al. |
| 2015/0188949 A1 | 7/2015 | Mahaffey et al. |
| 2015/0208273 A1 | 7/2015 | Raleigh et al. |
| 2015/0281079 A1 | 10/2015 | Fan et al. |
| 2015/0281952 A1 | 10/2015 | Patil et al. |
| 2015/0282058 A1 | 10/2015 | Forssell |
| 2015/0301824 A1 | 10/2015 | Patton et al. |
| 2015/0309849 A1 | 10/2015 | Lau et al. |
| 2015/0310025 A1 | 10/2015 | Rathgeber et al. |
| 2015/0319182 A1 | 11/2015 | Natarajan et al. |
| 2015/0326613 A1 | 11/2015 | Devarajan et al. |
| 2015/0350912 A1 | 12/2015 | Head et al. |
| 2015/0370793 A1 | 12/2015 | Chen et al. |
| 2015/0370846 A1 | 12/2015 | Zhau |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0036816 A1 | 2/2016 | Srinivasan |
| 2016/0036855 A1 | 2/2016 | Gangadharappa et al. |
| 2016/0036861 A1 | 2/2016 | Mattes et al. |
| 2016/0057166 A1 | 2/2016 | Chesla |
| 2016/0065618 A1 | 3/2016 | Banerjee |
| 2016/0078236 A1 | 3/2016 | Chesla |
| 2016/0080128 A1 | 3/2016 | Hebron |
| 2016/0085841 A1 | 3/2016 | Dorfman et al. |
| 2016/0147529 A1 | 5/2016 | Coleman et al. |
| 2016/0173501 A1 | 6/2016 | Brown |
| 2016/0180102 A1 | 6/2016 | Kim et al. |
| 2016/0191545 A1 | 6/2016 | Nanda et al. |
| 2016/0212237 A1 | 7/2016 | Nishijima |
| 2016/0219024 A1 | 7/2016 | Verzun et al. |
| 2016/0224360 A1 | 8/2016 | Wagner et al. |
| 2016/0224785 A1 | 8/2016 | Wagner et al. |
| 2016/0255051 A1 | 9/2016 | Williams et al. |
| 2016/0262021 A1 | 9/2016 | Lee et al. |

(56) References Cited

U.S. PATENT DOCUMENTS

| | | |
|---|---|---|
| 2016/0277447 A1 | 9/2016 | Pope et al. |
| 2016/0294826 A1 | 10/2016 | Han et al. |
| 2016/0314355 A1 | 10/2016 | Laska et al. |
| 2016/0337474 A1 | 11/2016 | Rao |
| 2016/0359872 A1 | 12/2016 | Yadav et al. |
| 2016/0359914 A1 | 12/2016 | Deen et al. |
| 2016/0378846 A1 | 12/2016 | Luse et al. |
| 2016/0380909 A1 | 12/2016 | Antony et al. |
| 2016/0381699 A1 | 12/2016 | Rubin et al. |
| 2017/0005790 A1 | 1/2017 | Brockmann et al. |
| 2017/0010826 A1 | 1/2017 | Basham et al. |
| 2017/0011078 A1 | 1/2017 | Gerrard et al. |
| 2017/0061006 A1 | 3/2017 | Hildebrand et al. |
| 2017/0061956 A1 | 3/2017 | Sarikaya et al. |
| 2017/0078721 A1 | 3/2017 | Brockmann et al. |
| 2017/0093923 A1 | 3/2017 | Duan |
| 2017/0103440 A1 | 4/2017 | Xing et al. |
| 2017/0111368 A1 | 4/2017 | Hibbert et al. |
| 2017/0126734 A1 | 5/2017 | Harney |
| 2017/0134422 A1 | 5/2017 | Shieh |
| 2017/0142096 A1 | 5/2017 | Reddy et al. |
| 2017/0142810 A1 | 5/2017 | Cho |
| 2017/0149614 A1 | 5/2017 | Zheng et al. |
| 2017/0149843 A1 | 5/2017 | Amulothu et al. |
| 2017/0171154 A1 | 6/2017 | Brown et al. |
| 2017/0171245 A1 | 6/2017 | Lee et al. |
| 2017/0177222 A1 | 6/2017 | Singh et al. |
| 2017/0177892 A1 | 6/2017 | Tingstrom et al. |
| 2017/0206207 A1 | 7/2017 | Bondurant et al. |
| 2017/0212830 A1 | 7/2017 | Thomas et al. |
| 2017/0223024 A1 | 8/2017 | Desai et al. |
| 2017/0237747 A1 | 8/2017 | Quinn et al. |
| 2017/0244606 A1 | 8/2017 | Htay |
| 2017/0250953 A1 | 8/2017 | Jain et al. |
| 2017/0257357 A1 | 9/2017 | Wang et al. |
| 2017/0279803 A1 | 9/2017 | Desai et al. |
| 2017/0279971 A1 | 9/2017 | Raleigh et al. |
| 2017/0331859 A1 | 11/2017 | Bansal et al. |
| 2017/0332238 A1 | 11/2017 | Bansal et al. |
| 2017/0339561 A1 | 11/2017 | Wennemyr et al. |
| 2017/0353433 A1 | 12/2017 | Antony et al. |
| 2017/0353483 A1 | 12/2017 | Weith et al. |
| 2017/0353496 A1 | 12/2017 | Pai et al. |
| 2017/0359220 A1 | 12/2017 | Weith et al. |
| 2017/0364505 A1 | 12/2017 | Sarikaya et al. |
| 2017/0364748 A1 | 12/2017 | Maji et al. |
| 2017/0372087 A1 | 12/2017 | Lee |
| 2017/0374032 A1 | 12/2017 | Woolward et al. |
| 2017/0374090 A1* | 12/2017 | McGrew .............. H04L 41/16 |
| 2017/0374101 A1 | 12/2017 | Woolward |
| 2018/0027009 A1 | 1/2018 | Santos et al. |
| 2018/0032258 A1 | 2/2018 | Edwards et al. |
| 2018/0035126 A1 | 2/2018 | Lee et al. |
| 2018/0041467 A1 | 2/2018 | Vats et al. |
| 2018/0041598 A1 | 2/2018 | Vats et al. |
| 2018/0061158 A1 | 3/2018 | Greene |
| 2018/0069702 A1 | 3/2018 | Ayyadevara et al. |
| 2018/0083915 A1 | 3/2018 | Medam et al. |
| 2018/0083944 A1 | 3/2018 | Vats et al. |
| 2018/0091583 A1 | 3/2018 | Collins et al. |
| 2018/0101422 A1 | 4/2018 | Flanigan et al. |
| 2018/0109498 A1 | 4/2018 | Singh |
| 2018/0115520 A1 | 4/2018 | Neuman et al. |
| 2018/0115523 A1 | 4/2018 | Subbarayan et al. |
| 2018/0115585 A1 | 4/2018 | Rubakha |
| 2018/0121110 A1 | 5/2018 | Sawhney |
| 2018/0121129 A1 | 5/2018 | Sawhney et al. |
| 2018/0123957 A1 | 5/2018 | Chen et al. |
| 2018/0159701 A1 | 6/2018 | Krause et al. |
| 2018/0167373 A1 | 6/2018 | Anderson et al. |
| 2018/0167415 A1 | 6/2018 | Khan et al. |
| 2018/0176262 A1 | 6/2018 | Kavi |
| 2018/0196680 A1 | 7/2018 | Wang et al. |
| 2018/0210801 A1 | 7/2018 | Wu et al. |
| 2018/0218148 A1 | 8/2018 | D'errico et al. |
| 2018/0218149 A1 | 8/2018 | Jacobs et al. |
| 2018/0220472 A1 | 8/2018 | Schopp |
| 2018/0233141 A1 | 8/2018 | Solomon et al. |
| 2018/0255591 A1 | 9/2018 | Valicherla et al. |
| 2018/0270732 A1 | 9/2018 | Garcia et al. |
| 2018/0288026 A1 | 10/2018 | Callaghan |
| 2018/0293024 A1 | 10/2018 | Baptist et al. |
| 2018/0295036 A1 | 10/2018 | Krishnamurthy et al. |
| 2018/0309764 A1 | 10/2018 | Kras et al. |
| 2018/0314846 A1 | 11/2018 | Schultz et al. |
| 2018/0316725 A1 | 11/2018 | Mani et al. |
| 2018/0341519 A1 | 11/2018 | Vyas et al. |
| 2018/0343238 A1 | 11/2018 | Tola |
| 2018/0349629 A1 | 12/2018 | Chenchev et al. |
| 2018/0359369 A1 | 12/2018 | Golshenas et al. |
| 2018/0367308 A1 | 12/2018 | Kacin et al. |
| 2018/0367396 A1 | 12/2018 | Kompella et al. |
| 2019/0020665 A1 | 1/2019 | Surcouf et al. |
| 2019/0039569 A1 | 2/2019 | Reed et al. |
| 2019/0052554 A1 | 2/2019 | Mukerji et al. |
| 2019/0058709 A1 | 2/2019 | Kempf et al. |
| 2019/0065278 A1 | 2/2019 | Jeuk et al. |
| 2019/0068449 A1 | 2/2019 | Sikand et al. |
| 2019/0073373 A1 | 3/2019 | Surale et al. |
| 2019/0075095 A1 | 3/2019 | Venable et al. |
| 2019/0081955 A1 | 3/2019 | Chugtu et al. |
| 2019/0095655 A1 | 3/2019 | Krawczewicz et al. |
| 2019/0104411 A1 | 4/2019 | Hotchkiss et al. |
| 2019/0109713 A1 | 4/2019 | Clark et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0149417 A1 | 5/2019 | Augusto Lopes et al. |
| 2019/0149429 A1 | 5/2019 | Stöcker |
| 2019/0156023 A1 | 5/2019 | Gerebe et al. |
| 2019/0158503 A1 | 5/2019 | Bansal et al. |
| 2019/0163406 A1 | 5/2019 | Kazi et al. |
| 2019/0174449 A1 | 6/2019 | Shan et al. |
| 2019/0213319 A1 | 7/2019 | Gerebe et al. |
| 2019/0215694 A1 | 7/2019 | Rubin et al. |
| 2019/0235605 A1 | 8/2019 | Chenchev et al. |
| 2019/0253274 A1 | 8/2019 | Van Dussen |
| 2019/0254094 A1 | 8/2019 | Babu et al. |
| 2019/0258813 A1 | 8/2019 | Lewis et al. |
| 2019/0260753 A1 | 8/2019 | Lewis et al. |
| 2019/0261203 A1 | 8/2019 | Raleigh |
| 2019/0268167 A1 | 8/2019 | White et al. |
| 2019/0281073 A1 | 9/2019 | Weith et al. |
| 2019/0281127 A1 | 9/2019 | Schmidt et al. |
| 2019/0289459 A1 | 9/2019 | Shan et al. |
| 2019/0297161 A1 | 9/2019 | Ayyadevara et al. |
| 2019/0303345 A1 | 10/2019 | Zhu et al. |
| 2019/0306754 A1 | 10/2019 | Shan et al. |
| 2019/0313359 A1 | 10/2019 | Lee et al. |
| 2019/0317821 A1 | 10/2019 | O'neal et al. |
| 2019/0318240 A1 | 10/2019 | Kulkarni et al. |
| 2019/0319950 A1 | 10/2019 | Bowling |
| 2019/0327320 A1 | 10/2019 | Rubin et al. |
| 2019/0332777 A1 | 10/2019 | Edwards et al. |
| 2019/0340341 A1 | 11/2019 | Fleck et al. |
| 2019/0349742 A1 | 11/2019 | Kim et al. |
| 2019/0349758 A1 | 11/2019 | Zhu et al. |
| 2019/0386969 A1 | 12/2019 | Verzun et al. |
| 2020/0004451 A1 | 1/2020 | Prohofsky |
| 2020/0007540 A1 | 1/2020 | Kawaguchi et al. |
| 2020/0021615 A1 | 1/2020 | Wainner et al. |
| 2020/0026850 A1 | 1/2020 | Levin et al. |
| 2020/0034248 A1 | 1/2020 | Nara et al. |
| 2020/0067801 A1 | 2/2020 | McCormick et al. |
| 2020/0077265 A1 | 3/2020 | Singh et al. |
| 2020/0089516 A1 | 3/2020 | Vijayvargiya et al. |
| 2020/0097195 A1 | 3/2020 | Fritz et al. |
| 2020/0112850 A1 | 4/2020 | Lee et al. |
| 2020/0153911 A1 | 5/2020 | Chauhan |
| 2020/0177333 A1 | 6/2020 | Liu |
| 2020/0193016 A1 | 6/2020 | Zeng et al. |
| 2020/0204551 A1 | 6/2020 | Singh et al. |
| 2020/0205209 A1 | 6/2020 | Pan et al. |
| 2020/0214054 A1 | 7/2020 | Qiao et al. |

(56) References Cited

U.S. PATENT DOCUMENTS

| | | |
|---|---|---|
| 2020/0218798 A1 | 7/2020 | Kosaka et al. |
| 2020/0219023 A1 | 7/2020 | Duchastel |
| 2020/0220848 A1 | 7/2020 | Patwardhan |
| 2020/0220875 A1 | 7/2020 | Harguindeguy et al. |
| 2020/0228936 A1 | 7/2020 | Talebi et al. |
| 2020/0229069 A1 | 7/2020 | Chun |
| 2020/0242493 A1* | 7/2020 | Botea .................. G06N 20/00 |
| 2020/0257179 A1 | 8/2020 | Barnum et al. |
| 2020/0259831 A1 | 8/2020 | Pampati et al. |
| 2020/0260401 A1 | 8/2020 | So |
| 2020/0267552 A1 | 8/2020 | Lee et al. |
| 2020/0267554 A1 | 8/2020 | Faccin et al. |
| 2020/0267785 A1 | 8/2020 | Talebi et al. |
| 2020/0272911 A1 | 8/2020 | Quiros Araya et al. |
| 2020/0280592 A1 | 9/2020 | Ithal et al. |
| 2020/0296619 A1 | 9/2020 | Pan et al. |
| 2020/0296779 A1 | 9/2020 | Moghe et al. |
| 2020/0304474 A1 | 9/2020 | Kisko et al. |
| 2020/0314127 A1* | 10/2020 | Wilson .................. H04L 43/16 |
| 2020/0314613 A1 | 10/2020 | Lee et al. |
| 2020/0314701 A1 | 10/2020 | Talebi et al. |
| 2020/0320189 A1 | 10/2020 | Zhang et al. |
| 2020/0322262 A1 | 10/2020 | Maino et al. |
| 2020/0322286 A1 | 10/2020 | Mehta et al. |
| 2020/0323030 A1 | 10/2020 | Mehta et al. |
| 2020/0334084 A1 | 10/2020 | Jacobson |
| 2020/0336484 A1 | 10/2020 | Mahajan et al. |
| 2020/0344637 A1 | 10/2020 | Kim et al. |
| 2020/0351699 A1 | 11/2020 | Pan et al. |
| 2020/0351980 A1 | 11/2020 | Talebi et al. |
| 2020/0351984 A1 | 11/2020 | Talebi et al. |
| 2020/0367141 A1 | 11/2020 | Cakulev et al. |
| 2020/0382488 A1 | 12/2020 | Liu et al. |
| 2020/0389426 A1 | 12/2020 | Enguehard et al. |
| 2020/0396678 A1 | 12/2020 | Lee et al. |
| 2020/0401452 A1 | 12/2020 | Piercey et al. |
| 2020/0404107 A1 | 12/2020 | Cheng et al. |
| 2021/0011984 A1 | 1/2021 | Renke et al. |
| 2021/0021431 A1 | 1/2021 | Guim Bernat et al. |
| 2021/0026819 A1 | 1/2021 | Beard et al. |
| 2021/0029029 A1 | 1/2021 | Mehmedagic et al. |
| 2021/0029119 A1 | 1/2021 | Raman et al. |
| 2021/0029132 A1 | 1/2021 | Wilczynski et al. |
| 2021/0029168 A1 | 1/2021 | Jeong |
| 2021/0037380 A1 | 2/2021 | Lee et al. |
| 2021/0056524 A1 | 2/2021 | Isgar |
| 2021/0056536 A1 | 2/2021 | Carter et al. |
| 2021/0075631 A1 | 3/2021 | Liao |
| 2021/0076444 A1 | 3/2021 | Shu et al. |
| 2021/0091941 A1 | 3/2021 | Pancras et al. |
| 2021/0099490 A1 | 4/2021 | Crabtree et al. |
| 2021/0105275 A1 | 4/2021 | Bansal et al. |
| 2021/0105596 A1 | 4/2021 | Prabhakar et al. |
| 2021/0109900 A1 | 4/2021 | Mcilroy et al. |
| 2021/0117241 A1 | 4/2021 | Xia |
| 2021/0120408 A1 | 4/2021 | Pazhyannur et al. |
| 2021/0120473 A1 | 4/2021 | Yao et al. |
| 2021/0120596 A1 | 4/2021 | Youn et al. |
| 2021/0122261 A1 | 4/2021 | Qiao et al. |
| 2021/0133313 A1 | 5/2021 | Sakib et al. |
| 2021/0136041 A1 | 5/2021 | Foxhoven et al. |
| 2021/0141655 A1 | 5/2021 | Gamage et al. |
| 2021/0157655 A1 | 5/2021 | Foreman |
| 2021/0168125 A1 | 6/2021 | Vemulpali et al. |
| 2021/0168142 A1 | 6/2021 | Foxhoven et al. |
| 2021/0168613 A1 | 6/2021 | Suh et al. |
| 2021/0168661 A1 | 6/2021 | Wong et al. |
| 2021/0168751 A1 | 6/2021 | Stojanovski et al. |
| 2021/0194760 A1 | 6/2021 | Barton et al. |
| 2021/0211408 A1 | 7/2021 | Porras et al. |
| 2021/0211423 A1 | 7/2021 | Tan et al. |
| 2021/0211870 A1 | 7/2021 | Perras et al. |
| 2021/0218594 A1 | 7/2021 | Sundararajan et al. |
| 2021/0218652 A1 | 7/2021 | Raut et al. |
| 2021/0218801 A1 | 7/2021 | Zhang et al. |
| 2021/0223128 A1 | 7/2021 | Kirch |
| 2021/0224091 A1 | 7/2021 | Hayatnagarkar et al. |
| 2021/0226850 A1 | 7/2021 | Xu et al. |
| 2021/0226910 A1 | 7/2021 | Ranpise et al. |
| 2021/0226987 A1 | 7/2021 | Summers et al. |
| 2021/0227438 A1 | 7/2021 | Xu |
| 2021/0234860 A1 | 7/2021 | Bansal et al. |
| 2021/0234898 A1 | 7/2021 | Desai et al. |
| 2021/0243678 A1 | 8/2021 | Drevon et al. |
| 2021/0250333 A1 | 8/2021 | Negrea et al. |
| 2021/0250890 A1 | 8/2021 | Won |
| 2021/0258859 A1 | 8/2021 | Watfa |
| 2021/0274340 A1 | 9/2021 | Sun et al. |
| 2021/0281572 A1 | 9/2021 | Fernandez-Spadaro et al. |
| 2021/0286899 A1 | 9/2021 | Schroeder et al. |
| 2021/0294970 A1 | 9/2021 | Bender et al. |
| 2021/0306310 A1 | 9/2021 | Tan |
| 2021/0307101 A1 | 9/2021 | Kim et al. |
| 2021/0312400 A1 | 10/2021 | Irimie et al. |
| 2021/0314301 A1 | 10/2021 | Chanak et al. |
| 2021/0314338 A1 | 10/2021 | Howe |
| 2021/0314399 A1 | 10/2021 | Hyun et al. |
| 2021/0320897 A1 | 10/2021 | Stojanovski et al. |
| 2021/0336932 A1 | 10/2021 | Chanak et al. |
| 2021/0336933 A1 | 10/2021 | Shah et al. |
| 2021/0336934 A1 | 10/2021 | Deshmukh et al. |
| 2021/0336959 A1 | 10/2021 | Shah et al. |
| 2021/0344492 A1 | 11/2021 | Goodsitt et al. |
| 2021/0344722 A1 | 11/2021 | Goyal et al. |
| 2021/0360294 A1 | 11/2021 | Liao et al. |
| 2021/0360371 A1 | 11/2021 | Qiao et al. |
| 2021/0367920 A1 | 11/2021 | Devarajan et al. |
| 2021/0367944 A1 | 11/2021 | Gupta et al. |
| 2021/0368339 A1 | 11/2021 | Watfa et al. |
| 2021/0368581 A1 | 11/2021 | Shan |
| 2021/0377210 A1 | 12/2021 | Singh et al. |
| 2021/0377222 A1 | 12/2021 | Sharma et al. |
| 2021/0377223 A1 | 12/2021 | Chanak et al. |
| 2021/0377303 A1 | 12/2021 | Bui et al. |
| 2021/0382739 A1 | 12/2021 | Guo et al. |
| 2021/0385642 A1 | 12/2021 | Di et al. |
| 2021/0385742 A1 | 12/2021 | Liao |
| 2021/0397313 A1 | 12/2021 | Desai et al. |
| 2021/0397463 A1 | 12/2021 | Schimon et al. |
| 2021/0399954 A1 | 12/2021 | Dabell et al. |
| 2021/0400060 A1 | 12/2021 | Chacko |
| 2021/0406127 A1 | 12/2021 | Knierim et al. |
| 2021/0406902 A1 | 12/2021 | Bernert et al. |
| 2021/0409441 A1 | 12/2021 | Singh et al. |
| 2021/0409449 A1 | 12/2021 | Crabtree et al. |
| 2021/0410059 A1 | 12/2021 | Talebi et al. |
| 2022/0007161 A1 | 1/2022 | Shan |
| 2022/0007180 A1 | 1/2022 | Liao et al. |
| 2022/0007437 A1 | 1/2022 | Goenka et al. |
| 2022/0014466 A1 | 1/2022 | Doshi et al. |
| 2022/0014512 A1 | 1/2022 | Raleigh et al. |
| 2022/0029965 A1 | 1/2022 | Chanak et al. |
| 2022/0030495 A1 | 1/2022 | Qiao et al. |
| 2022/0038544 A1 | 2/2022 | Grinstein et al. |
| 2022/0038986 A1 | 2/2022 | Soliman et al. |
| 2022/0039004 A1 | 2/2022 | Soliman et al. |
| 2022/0043665 A1 | 2/2022 | Vidyadhara et al. |
| 2022/0046059 A1 | 2/2022 | Pandurangi et al. |
| 2022/0052850 A1 | 2/2022 | Fagan et al. |
| 2022/0052961 A1 | 2/2022 | Chauhan et al. |
| 2022/0053449 A1 | 2/2022 | Shan |
| 2022/0060398 A1 | 2/2022 | Shishir et al. |
| 2022/0060507 A1 | 2/2022 | Crabtree et al. |
| 2022/0060509 A1 | 2/2022 | Crabtree et al. |
| 2022/0060557 A1 | 2/2022 | Bathla et al. |
| 2022/0070183 A1 | 3/2022 | Goyal |
| 2022/0070967 A1 | 3/2022 | Li et al. |
| 2022/0086639 A1 | 3/2022 | Lu et al. |
| 2022/0092024 A1 | 3/2022 | Kavaipatti et al. |
| 2022/0094706 A1 | 3/2022 | Higgins et al. |
| 2022/0095260 A1 | 3/2022 | Shan |
| 2022/0103525 A1 | 3/2022 | Shribman et al. |
| 2022/0103987 A1 | 3/2022 | Shan |
| 2022/0104164 A1 | 3/2022 | Kedalagudde et al. |

(56) References Cited

U.S. PATENT DOCUMENTS

| | | |
|---|---|---|
| 2022/0104296 A1 | 3/2022 | Mary et al. |
| 2022/0109696 A1 | 4/2022 | Deshmukh et al. |
| 2022/0110023 A1 | 4/2022 | Wu et al. |
| 2022/0116397 A1 | 4/2022 | Deshmukh et al. |
| 2022/0116814 A1 | 4/2022 | Di et al. |
| 2022/0117036 A1 | 4/2022 | Moustafa et al. |
| 2022/0124521 A1 | 4/2022 | Xu et al. |
| 2022/0124595 A1 | 4/2022 | Xu et al. |
| 2022/0129583 A1 | 4/2022 | Balasubramanian et al. |
| 2022/0141662 A1 | 5/2022 | Liao |
| 2022/0150312 A1 | 5/2022 | Ranpise et al. |
| 2022/0159029 A1 | 5/2022 | Bendersky et al. |
| 2022/0159527 A1 | 5/2022 | Lee et al. |
| 2022/0159605 A1 | 5/2022 | Li et al. |
| 2022/0164186 A1 | 5/2022 | Pamidala et al. |
| 2022/0167299 A1 | 5/2022 | Xu et al. |
| 2022/0174580 A1 | 6/2022 | You et al. |
| 2022/0182412 A1 | 6/2022 | Borak |
| 2022/0191052 A1 | 6/2022 | Garcia et al. |
| 2022/0191100 A1 | 6/2022 | Kim et al. |
| 2022/0191736 A1 | 6/2022 | Barton et al. |
| 2022/0191765 A1 | 6/2022 | Ding |
| 2022/0200924 A1 | 6/2022 | Lu et al. |
| 2022/0200972 A1 | 6/2022 | Potlapally et al. |
| 2022/0200993 A1 | 6/2022 | Smith |
| 2022/0201041 A1 | 6/2022 | Keiser et al. |
| 2022/0201638 A1 | 6/2022 | Arrobo et al. |
| 2022/0210698 A1 | 6/2022 | Ly et al. |
| 2022/0217084 A1 | 7/2022 | Arora et al. |
| 2022/0224703 A1 | 7/2022 | Devarajan |
| 2022/0225448 A1 | 7/2022 | Li et al. |
| 2022/0232020 A1 | 7/2022 | Kandachar Sridhara Rao et al. |
| 2022/0232363 A1 | 7/2022 | Watfa et al. |
| 2022/0239698 A1 | 7/2022 | Anantharaju |
| 2022/0247771 A1 | 8/2022 | Higgins et al. |
| 2022/0255966 A1 | 8/2022 | Sienicki et al. |
| 2022/0263835 A1 | 8/2022 | Pieczul et al. |
| 2022/0263913 A1 | 8/2022 | Zhang et al. |
| 2022/0264370 A1 | 8/2022 | Qiao et al. |
| 2022/0264403 A1 | 8/2022 | Watfa et al. |
| 2022/0264444 A1 | 8/2022 | Ryu et al. |
| 2022/0264503 A1 | 8/2022 | Starsinic et al. |
| 2022/0266451 A1 | 8/2022 | Cristache |
| 2022/0272614 A1 | 8/2022 | Lu et al. |
| 2022/0272620 A1 | 8/2022 | Ninglekhu et al. |
| 2022/0278900 A1 | 9/2022 | Pieczul et al. |
| 2022/0279075 A1 | 9/2022 | Fan et al. |
| 2022/0286428 A1 | 9/2022 | Howe et al. |
| 2022/0286429 A1 | 9/2022 | Howe et al. |
| 2022/0286480 A1 | 9/2022 | Jadhav et al. |
| 2022/0286911 A1 | 9/2022 | Howe et al. |
| 2022/0294540 A1 | 9/2022 | Black et al. |
| 2022/0295440 A1 | 9/2022 | Kumar et al. |
| 2022/0309152 A1 | 9/2022 | Araujo et al. |
| 2022/0311767 A1 | 9/2022 | Ouellet |
| 2022/0312176 A1 | 9/2022 | Matolia et al. |
| 2022/0312299 A1 | 9/2022 | Mochizuki et al. |
| 2022/0312517 A1 | 9/2022 | Xu et al. |
| 2022/0329442 A1 | 10/2022 | Bulusu |
| 2022/0329477 A1 | 10/2022 | Chiganmi et al. |
| 2022/0329495 A1 | 10/2022 | Xie et al. |
| 2022/0329585 A1 | 10/2022 | Chhabra et al. |
| 2022/0330138 A1 | 10/2022 | Shan |
| 2022/0330193 A1 | 10/2022 | Shan |
| 2022/0334864 A1 | 10/2022 | KN et al. |
| 2022/0338000 A1 | 10/2022 | Lee et al. |
| 2022/0345875 A1 | 10/2022 | Kumar |
| 2022/0353244 A1 | 11/2022 | Kahn et al. |
| 2022/0353799 A1 | 11/2022 | Talebi et al. |
| 2022/0360670 A1 | 11/2022 | Singh et al. |
| 2022/0361136 A1 | 11/2022 | Watfa et al. |
| 2022/0368726 A1 | 11/2022 | Balasubramanian et al. |
| 2022/0369408 A1 | 11/2022 | Shariat et al. |
| 2022/0377529 A1 | 11/2022 | Kim et al. |
| 2022/0377617 A1 | 11/2022 | Deng et al. |
| 2022/0377654 A1 | 11/2022 | Soliman et al. |
| 2022/0386100 A1 | 12/2022 | Lee et al. |
| 2022/0391867 A1 | 12/2022 | Glaser |
| 2022/0393943 A1 | 12/2022 | Pangeni et al. |
| 2022/0394566 A1 | 12/2022 | Liu et al. |
| 2022/0400378 A1 | 12/2022 | Wang et al. |
| 2022/0408396 A1 | 12/2022 | Youn et al. |
| 2022/0413883 A1 | 12/2022 | Clebsch et al. |
| 2022/0417252 A1 | 12/2022 | Moon et al. |
| 2022/0417264 A1 | 12/2022 | Moon |
| 2022/0417286 A1 | 12/2022 | Moon et al. |
| 2023/0007439 A1 | 1/2023 | Williams et al. |
| 2023/0007464 A1 | 1/2023 | Lee et al. |
| 2023/0007611 A1 | 1/2023 | Karampatsis et al. |
| 2023/0011468 A1 | 1/2023 | Giri et al. |
| 2023/0015603 A1 | 1/2023 | Smith |
| 2023/0018809 A1 | 1/2023 | Deshmukh |
| 2023/0019448 A1 | 1/2023 | Deshmukh et al. |
| 2023/0022134 A1 | 1/2023 | Talwar et al. |
| 2023/0023571 A1 | 1/2023 | Xing et al. |
| 2023/0024999 A1 | 1/2023 | Wu et al. |
| 2023/0027290 A1 | 1/2023 | Chen et al. |
| 2023/0027507 A1 | 1/2023 | He et al. |
| 2023/0029714 A1 | 2/2023 | Xu et al. |
| 2023/0032790 A1 | 2/2023 | Mahajan et al. |
| 2023/0040365 A1 | 2/2023 | Raleigh |
| 2023/0040747 A1 | 2/2023 | Watfa et al. |
| 2023/0042646 A1 | 2/2023 | Mahadevan et al. |
| 2023/0044346 A1 | 2/2023 | Nuggehalli et al. |
| 2023/0052699 A1 | 2/2023 | Ninglekhu et al. |
| 2023/0052827 A1 | 2/2023 | Araujo et al. |
| 2023/0056442 A1 | 2/2023 | Ly et al. |
| 2023/0058336 A1 | 2/2023 | Kim et al. |
| 2023/0059173 A1 | 2/2023 | Moon |
| 2023/0059726 A1 | 2/2023 | Osipov et al. |
| 2023/0067223 A1 | 3/2023 | Freed et al. |
| 2023/0073757 A1 | 3/2023 | Chandramouli et al. |
| 2023/0078317 A1 | 3/2023 | Xing et al. |
| 2023/0083175 A1 | 3/2023 | Xiong |
| 2023/0094062 A1 | 3/2023 | Kim et al. |
| 2023/0098558 A1 | 3/2023 | Savir et al. |
| 2023/0109272 A1 | 4/2023 | Ryu et al. |
| 2023/0113180 A1 | 4/2023 | Srinivasan et al. |
| 2023/0113519 A1 | 4/2023 | Fernandez et al. |
| 2023/0115982 A1 | 4/2023 | Lin et al. |
| 2023/0116463 A1 | 4/2023 | Rath et al. |
| 2023/0118271 A1 | 4/2023 | Punathil |
| 2023/0129117 A1 | 4/2023 | Ding et al. |
| 2023/0130746 A1 | 4/2023 | Binder et al. |
| 2023/0133444 A1 | 5/2023 | Dimitrovski et al. |
| 2023/0135699 A1 | 5/2023 | Liao et al. |
| 2023/0136984 A1 | 5/2023 | Lee et al. |
| 2023/0138033 A1 | 5/2023 | Rajadurai et al. |
| 2023/0147538 A1 | 5/2023 | Lee et al. |
| 2023/0153447 A1 | 5/2023 | Kapadia |
| 2023/0156513 A1 | 5/2023 | Xing et al. |
| 2023/0156514 A1 | 5/2023 | Eriksson et al. |
| 2023/0163984 A1 | 5/2023 | Shan |
| 2023/0164523 A1 | 5/2023 | Wu et al. |
| 2023/0171280 A1 | 6/2023 | Bansal |
| 2023/0171824 A1 | 6/2023 | Purkayastha et al. |
| 2023/0179632 A1 | 6/2023 | Duraisamy et al. |
| 2023/0188525 A1 | 6/2023 | Singh et al. |
| 2023/0189192 A1 | 6/2023 | Talebi et al. |
| 2023/0195884 A1 | 6/2023 | Belair et al. |
| 2023/0198946 A1 | 6/2023 | Zacks et al. |
| 2023/0199006 A1* | 6/2023 | Gurnov ............... H04L 63/1425 726/23 |
| 2023/0199017 A1 | 6/2023 | Peter |
| 2023/0199632 A1 | 6/2023 | Talebi et al. |
| 2023/0205505 A1 | 6/2023 | Chen et al. |
| 2023/0206329 A1 | 6/2023 | Cella et al. |
| 2023/0206348 A1* | 6/2023 | Reddy ................. G06Q 20/389 705/30 |
| 2023/0208810 A1 | 6/2023 | Dhanasekar et al. |
| 2023/0209329 A1 | 6/2023 | Guo et al. |
| 2023/0224304 A1 | 7/2023 | Lukanov et al. |
| 2023/0231884 A1 | 7/2023 | Deshmukh et al. |
| 2023/0239270 A1 | 7/2023 | Nahas et al. |

(56) References Cited

U.S. PATENT DOCUMENTS

| | | |
|---|---|---|
| 2023/0239325 A1 | 7/2023 | Keiser, Jr. |
| 2023/0247003 A1 | 8/2023 | Chanak et al. |
| 2023/0247027 A1 | 8/2023 | Brar et al. |
| 2023/0247087 A1 | 8/2023 | Nagaraja et al. |
| 2023/0254318 A1 | 8/2023 | Hu et al. |
| 2023/0262030 A1 | 8/2023 | Bansal et al. |
| 2023/0262818 A1 | 8/2023 | Kim et al. |
| 2023/0269137 A1 | 8/2023 | Fehring et al. |
| 2023/0283639 A1 | 9/2023 | Melson et al. |
| 2023/0284077 A1 | 9/2023 | Pateromichelakis |
| 2023/0290485 A1* | 9/2023 | Fairuz ................ G16H 50/20 |
| 2023/0291735 A1 | 9/2023 | Cheethirala et al. |
| 2023/0300651 A1 | 9/2023 | Kim et al. |
| 2023/0300702 A1 | 9/2023 | You et al. |
| 2023/0309158 A1 | 9/2023 | Qiao et al. |
| 2023/0319047 A1 | 10/2023 | Wu et al. |
| 2023/0319112 A1 | 10/2023 | Kaimal et al. |
| 2023/0319679 A1 | 10/2023 | Sung et al. |
| 2023/0319685 A1 | 10/2023 | Talebi et al. |
| 2023/0319915 A1 | 10/2023 | Paladugu et al. |
| 2023/0328821 A1 | 10/2023 | Talebi et al. |
| 2023/0336471 A1 | 10/2023 | Dhody |
| 2023/0336977 A1 | 10/2023 | Henry et al. |
| 2023/0344917 A1 | 10/2023 | Chanak et al. |
| 2023/0362198 A1 | 11/2023 | Jung et al. |
| 2023/0362623 A1 | 11/2023 | Lee et al. |
| 2023/0362632 A1 | 11/2023 | Hu et al. |
| 2023/0362640 A1 | 11/2023 | Edge |
| 2023/0362704 A1 | 11/2023 | Edge et al. |
| 2023/0367833 A1 | 11/2023 | Kol et al. |
| 2023/0368193 A1 | 11/2023 | Russinovich et al. |
| 2023/0370992 A1 | 11/2023 | You et al. |
| 2023/0371111 A1 | 11/2023 | Xu et al. |
| 2023/0388785 A1 | 11/2023 | Ferdi et al. |
| 2023/0397086 A1 | 12/2023 | Kim et al. |
| 2023/0403272 A1 | 12/2023 | Cheethirala et al. |
| 2023/0403305 A1 | 12/2023 | Dementyev et al. |
| 2023/0412638 A1 | 12/2023 | Dogaru et al. |
| 2023/0421478 A1 | 12/2023 | Chhabra |
| 2023/0422149 A1 | 12/2023 | Kim et al. |
| 2024/0007983 A1 | 1/2024 | Liu et al. |
| 2024/0008130 A1 | 1/2024 | Kim et al. |
| 2024/0012674 A1 | 1/2024 | Xie et al. |
| 2024/0015567 A1 | 1/2024 | Mladin et al. |
| 2024/0022469 A1 | 1/2024 | Hu et al. |
| 2024/0022593 A1 | 1/2024 | Costa et al. |
| 2024/0048229 A1 | 2/2024 | Kumar et al. |
| 2024/0048966 A1 | 2/2024 | Suh |
| 2024/0049171 A1 | 2/2024 | Khirallah et al. |
| 2024/0056904 A1 | 2/2024 | Watfa et al. |
| 2024/0056947 A1 | 2/2024 | Watfa et al. |
| 2024/0056957 A1 | 2/2024 | Wang |
| 2024/0073249 A1 | 2/2024 | Cirello Filho et al. |
| 2024/0073252 A1 | 2/2024 | Kathpal et al. |
| 2024/0073772 A1 | 2/2024 | Gupta et al. |
| 2024/0080340 A1 | 3/2024 | Ben et al. |
| 2024/0080342 A1 | 3/2024 | Mishra et al. |
| 2024/0080730 A1 | 3/2024 | Zhang et al. |
| 2024/0080791 A1 | 3/2024 | Aghili et al. |
| 2024/0086558 A1 | 3/2024 | Jadhav et al. |
| 2024/0089291 A1 | 3/2024 | Shpilyuck et al. |
| 2024/0098089 A1 | 3/2024 | Adogla et al. |
| 2024/0104553 A1 | 3/2024 | Thorpe |
| 2024/0106821 A1 | 3/2024 | Crawford et al. |
| 2024/0106833 A1 | 3/2024 | Ravichandran et al. |
| 2024/0106855 A1 | 3/2024 | Sundararajan et al. |
| 2024/0107481 A1 | 3/2024 | Tiwari et al. |
| 2024/0111821 A1 | 4/2024 | Dogaru et al. |
| 2024/0114057 A1 | 4/2024 | Bjerrum et al. |
| 2024/0129321 A1 | 4/2024 | Howe et al. |
| 2024/0129338 A1 | 4/2024 | Azad et al. |
| 2024/0146689 A1 | 5/2024 | Bansal et al. |
| 2024/0147207 A1 | 5/2024 | Watfa et al. |
| 2024/0152602 A1 | 5/2024 | Belair et al. |
| 2024/0154970 A1 | 5/2024 | Cheethirala et al. |
| 2024/0163308 A1 | 5/2024 | Kahn et al. |
| 2024/0163312 A1 | 5/2024 | Azad et al. |
| 2024/0168793 A1 | 5/2024 | Pyka et al. |
| 2024/0169062 A1 | 5/2024 | Lee et al. |
| 2024/0171969 A1 | 5/2024 | Kumar et al. |
| 2024/0179066 A1 | 5/2024 | Shen et al. |
| 2024/0179070 A1 | 5/2024 | Zhou et al. |
| 2024/0179071 A1 | 5/2024 | Zhou et al. |
| 2024/0179168 A1 | 5/2024 | Manthiramoorthy et al. |
| 2024/0179509 A1 | 5/2024 | Fu et al. |
| 2024/0187968 A1 | 6/2024 | Tiwari et al. |
| 2024/0187990 A1 | 6/2024 | Chen et al. |
| 2024/0205191 A1 | 6/2024 | Vijayvargiya et al. |
| 2024/0205863 A1 | 6/2024 | Nassar et al. |
| 2024/0236047 A1 | 7/2024 | Filho et al. |
| 2024/0241978 A1 | 7/2024 | Chopra et al. |
| 2024/0244014 A1 | 7/2024 | De et al. |
| 2024/0273211 A1 | 8/2024 | Singh |
| 2024/0275680 A1 | 8/2024 | Palnati et al. |
| 2024/0275803 A1 | 8/2024 | Varanasi et al. |
| 2024/0283826 A1 | 8/2024 | Ganguli et al. |
| 2024/0291846 A1 | 8/2024 | Saraf et al. |
| 2024/0297881 A1 | 9/2024 | Bansal |
| 2024/0303336 A1 | 9/2024 | Tammireddy et al. |
| 2024/0314140 A1 | 9/2024 | Beevor |
| 2024/0314176 A1 | 9/2024 | Varanasi et al. |
| 2024/0323189 A1 | 9/2024 | Mihajlovic et al. |
| 2024/0334190 A1 | 10/2024 | Cheethirala et al. |
| 2024/0356918 A1 | 10/2024 | Darbarwar et al. |
| 2024/0364704 A1 | 10/2024 | Darbarwar et al. |
| 2024/0388606 A1 | 11/2024 | Mihajlovic et al. |
| 2024/0422198 A1 | 12/2024 | Pampati et al. |
| 2025/0112923 A1 | 4/2025 | Cirello Filho et al. |
| 2025/0112930 A1 | 4/2025 | Kozin |
| 2025/0112962 A1 | 4/2025 | Cirello Filho et al. |
| 2025/0117486 A1* | 4/2025 | Pickman ............ H04L 63/1433 |
| 2025/0150573 A1* | 5/2025 | Pantapalli ............ G06T 7/0002 |

OTHER PUBLICATIONS

An et al., "GPT-LAD: Leveraging Large Multimodal Models for Logical Anomaly Detection," ICASSP 2025-2025 IEEE International Conference on Acoustics, Speech and Signal Processing (ICASSP) Year: 2025 | Conference Paper | Publisher: IEEE.*

Office Communication for U.S. Appl. No. 17/900,121 mailed Apr. 4, 2023, 13 Pages.

Office Communication for U.S. Appl. No. 18/091,006 mailed Apr. 19, 2023, 9 Pages.

Office Communication for U.S. Appl. No. 17/954,697 mailed May 12, 2023, 5 Pages.

Office Communication for U.S. Appl. No. 18/131,151 mailed Jun. 8, 2023, 9 Pages.

Office Communication for U.S. Appl. No. 17/954,697 mailed Jan. 20, 2023, 13 Pages.

Office Communication for U.S. Appl. No. 18/094,858 mailed Mar. 16, 2023, 10 Pages.

Office Communication for U.S. Appl. No. 18/091,006 mailed Mar. 31, 2023, 12 Pages.

Office Communication for U.S. Appl. No. 17/733,735 mailed Jul. 12, 2022, 38 Pages.

Office Communication for U.S. Appl. No. 17/733,735 mailed Nov. 1, 2022, 7 Pages.

Office Communication for U.S. Appl. No. 17/889,788 mailed Nov. 7, 2022, 12 Pages.

Office Communication for U.S. Appl. No. 18/091,895 mailed Apr. 5, 2023, 12 Pages.

Office Communication for U.S. Appl. No. 18/094,858 mailed Jul. 7, 2023, 12 Pages.

Office Communication for U.S. Appl. No. 18/131,151 mailed Jul. 10, 2023, 7 Pages.

Office Communication for U.S. Appl. No. 18/094,858 mailed Sep. 19, 2023, 4 Pages.

Office Communication for U.S. Appl. No. 18/091,895 mailed Jul. 11, 2023, 9 pages.

(56) References Cited

OTHER PUBLICATIONS

Office Communication for U.S. Appl. No. 18/236,360 mailed Oct. 25, 2023, 12 pages.
Office Communication for U.S. Appl. No. 18/236,360 mailed Nov. 13, 2023, 2 pages.
Office Communication for U.S. Appl. No. 18/238,649 mailed Nov. 1, 2023, 13 pages.
Office Communication for U.S. Appl. No. 18/094,858 mailed Oct. 25,2023, 7 pages.
Office Communication for U.S. Appl. No. 18/238,649 mailed Jan. 26, 2024, 11 pages.
Office Communication for U.S. Appl. No. 18/238,649 mailed Feb. 26, 2024, 4 pages.
Office Communication for U.S. Appl. No. 18/238,649 mailed Mar. 14, 2024, 5 pages.
Office Communication for U.S. Appl. No. 18/587,821 mailed May 3, 2024, 12 pages.
Office Communication for U.S. Appl. No. 18/740,622 mailed Sep. 5, 2024, 54 pages.
Jennings et al REsource Location and Discoveryu (RELOAD) Base Protocol, Internet Engineering Task Force (IETF), Request for Comments:RFC 6940, pp. 1-176 (Year: 2014).
Uriarte et al "Expressive Policy-Based Access Control for Resource-Constrained Devices," Special Section on Security and Privacy in Applications and Services for Future Internet of Things, IEEE Access, pp. 15-46 (Year: 2017).
Office Communication for U.S. Appl. No. 18/740,667 mailed Sep. 19, 2024, 8 pages.
Office Communication for U.S. Appl. No. 18/740,622 mailed Jan. 10, 2025, 39 pages.
Soltani et al "A New Approach to Client Onboarding using Self-Soverign Identity and Distributed Ledger," IEEE, 2018, pp. 1129-1136.
Seleznyov et al "An Access Control Model Based on Distributed Knowledge Management," IEEE Computer Society, 2004, pp. 1-4.
Office Communication for U.S. Appl. No. 18/740,667 mailed Jan. 23, 2025, 11 pages.
Office Communication for U.S. Appl. No. 18/899,488 mailed Jan. 16, 2025, 9 pages.
Office Communication for U.S. Appl. No. 19/048,457 mailed Apr. 2, 2025, 14 pages.
Office Communication for U.S. Appl. No. 18/740,622 mailed Apr. 7, 2025, 3 pages.
Office Communication for U.S. Appl. No. 18/740,622 mailed May 5, 2025, 34 pages.
Northern et al., "Building Secure Environments for Microservices" SRMC, Year: 2022, pp. 27-31.
Al Qassem et al., "Optimal Resource Allocation for Containerized Cloud Microservices", ICECTA, Year: 2022, pp. 271-274.
Office Communication for U.S. Appl. No. 19/063,742 mailed Apr. 24, 2025, 9 pages.
Office Communication for U.S. Appl. No. 19/063,742 mailed Aug. 12, 2025, 7 pages.

\* cited by examiner

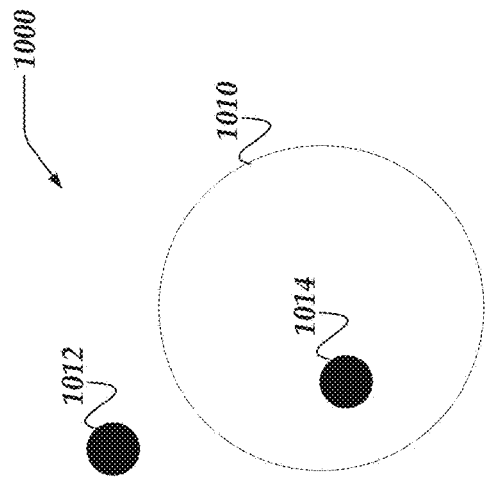
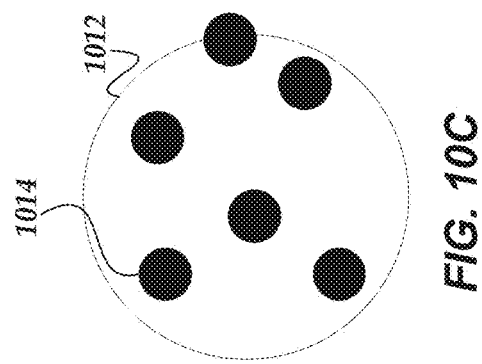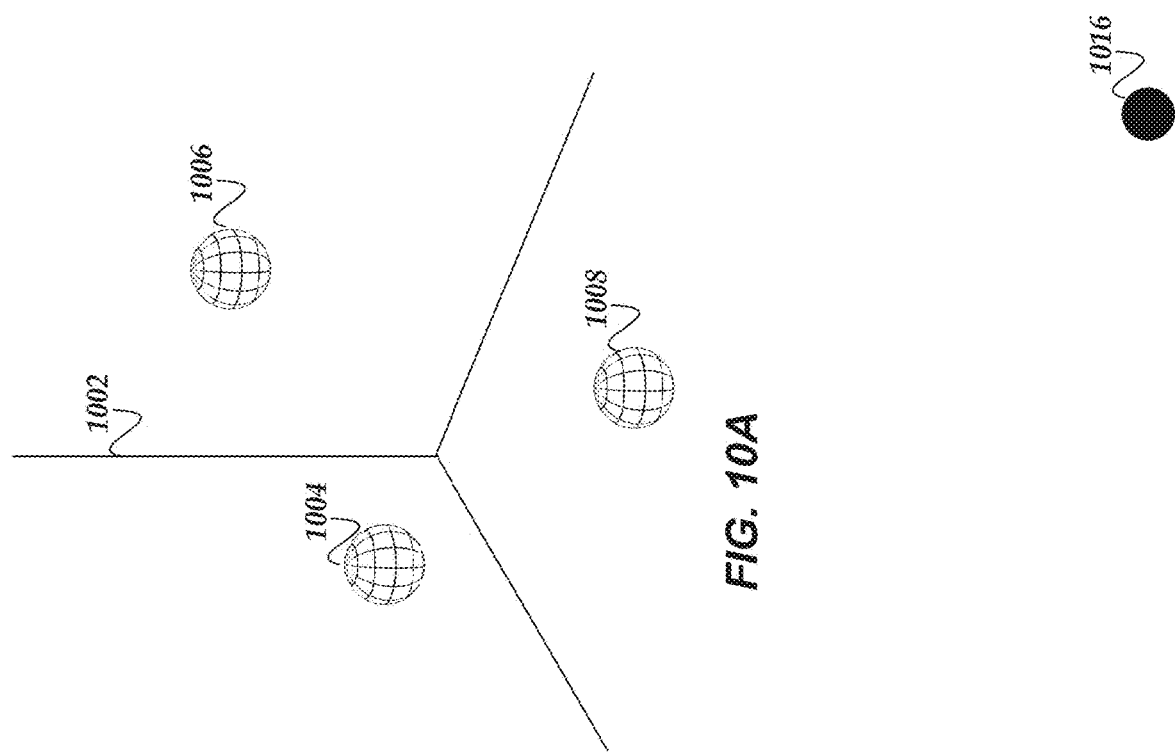

ANOMALY DETECTION IN MANAGED NETWORKS

TECHNICAL FIELD

The present invention relates generally to network security, and more particularly, but not exclusively, to anomaly detection in managed networks.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, the regulatory environment has been adapting to the increase in computer-based services. Accordingly, organizations may be required to comply with regulatory regimes from multiple jurisdictions related to various critical subjects, such as finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Organizations have adapted to these requirements or conventions by deploy policy management tools that enable detailed or explicit security policies to be expressed or enforced using various policy description languages. However, some networking environments may generate numerous events or signals where only some of which may be associated with anomalous activity or threat activity. Accordingly, in some cases, organizations may consume significant effort or resources to determine the events or signals that may be associated with anomalous activity or threats. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 10A illustrates visualizations of a multi-dimensional event space with detection models for anomaly detection in managed networks in accordance with one or more of the various embodiments;

FIG. 10B illustrates a 2-D visualization of a detection model for anomaly detection in managed networks in accordance with one or more of the various embodiments;

FIG. 10C illustrates a 2-D representation of training a detection model for anomaly detection in managed networks in accordance with one or more of the various embodiments;

DETAILED DESCRIPTION OF VARIOUS EMBODIMENTS

Figure 1:
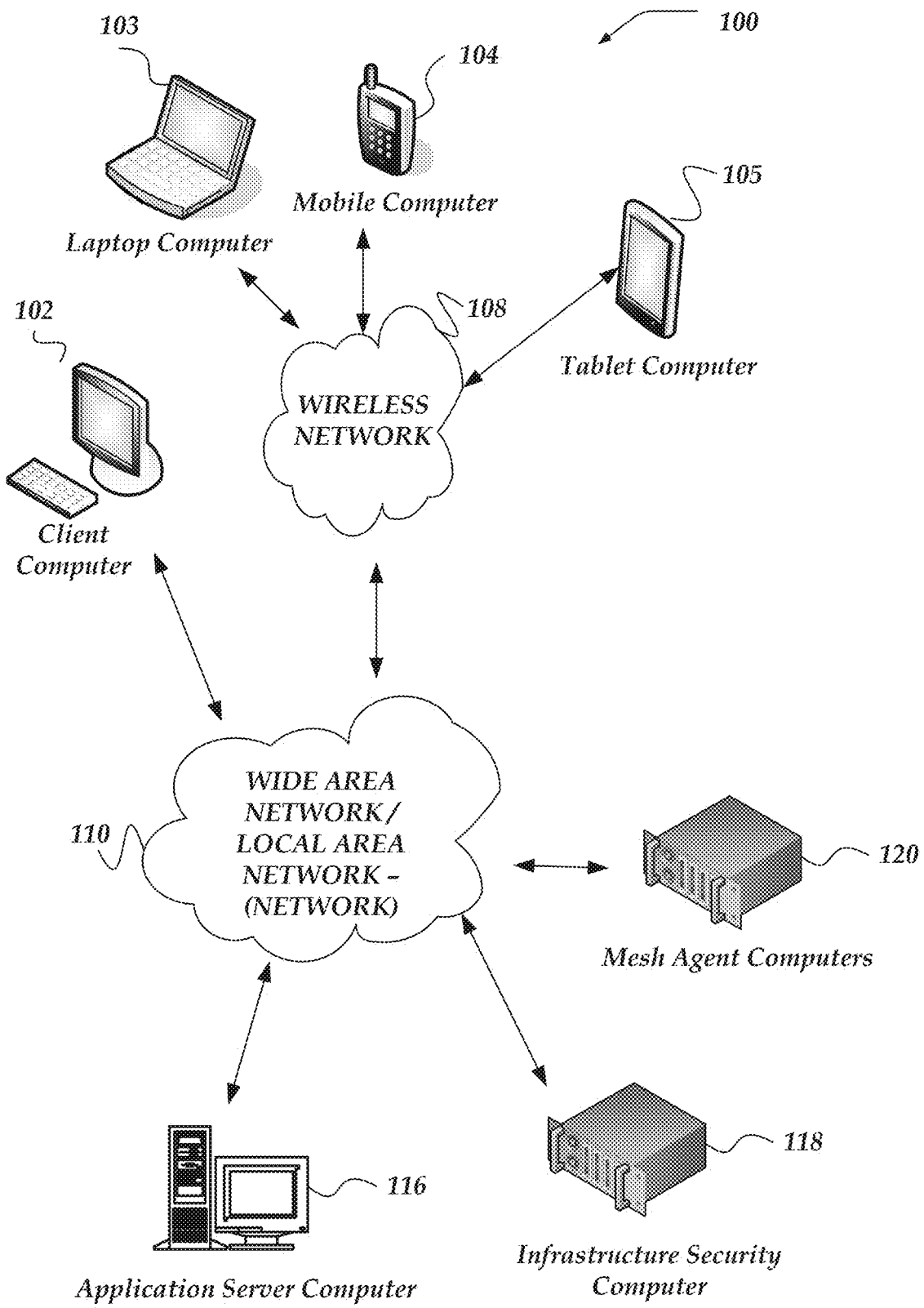
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, *Julia*, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage devices and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to an interactive packet interchange between two or more communicating endpoints, such as network devices. Connections may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, a virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "transport protocol" refers generally to communication protocols that may often or primarily used for carrying data for other protocols. Describing a protocol as a transport protocol may be relative to the one or more protocols that it may be carrying. For example, some conventional transport protocols such as Transmission Control Protocol (TCP) or User Datagram Protocol (UDP) may be themselves be carried in low level transport protocols, such as Internet Protocol (IP), or the like.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential information" refers to data or data structures that include credential secrets that enable access to protected resource servers. For example, credential information may include usernames, passwords, pass-phrases, security certificates, or the like.

As used herein, "activity" refers to behaviors, messages, communications, or the like, that may be observed occurring in a network or communicated to or via the network. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare which activities may be relevant.

As used herein, the term "policy" refers to data or data structures that include particular instructions or declarations that may be evaluated to determine if a resource may be accessed by a client in an overlay network. Further, in some cases, policies may define one or more actions, conditions, constraints, or the like, that may be applied to interacting with resources in a network.

As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the terms "activity event," or "event" may refer to data structures used to represent various characteristics or features associated with an activity.

As used herein, the terms "event vector," or "high-dimensional event vector" may refer to data structures generated by embedding activity events using one or more embedding methods. Event vectors may include hundreds to thousands of elements depending on the local configuration or requirements.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to anomaly detection in managed networks. In one or more of the various embodiments, one or more events may be generated based on an activity that may be observed in a monitored network such that each event includes one or more values associated with the activity.

In one or more of the various embodiments, one or more high dimensional event vectors may be embedded based on the one or more events and the one or more values included for each event.

In one or more of the various embodiments, one or more anomalous events may be determined based on one or more detection models trained with a cluster of events associated with the one or more high dimensional event vectors such that each anomalous event may correspond to a high dimensional event vector compared to one or more conditions declared in the one or more detection models and such that each anomalous event may be associated with one or more of a priority score or a confidence score.

In one or more of the various embodiments, a user interface that displays a report that includes the one or more anomalous events may be generated and arranged based on one or more of the priority score, the confidence score, a user selected preference, one or more feedback metrics associated with the user interface, or the like.

In one or more of the various embodiments, determining the one or more anomalous events may include: determining one or more metrics that exceed a threshold value provided by a detection model based on the one or more high dimensional event vectors and one or more of a distance from a center of the detection model, a deviation from a probability curve provided by the detection model, a similarity to a vector provided by the detection model and the high dimensional event vector, or the like; determining the one or more anomalous events based on a portion of the one or more high dimensional event vectors associated with the one or more metrics that exceeded the one or more threshold values; or the like.

In one or more of the various embodiments, one or more training events may be determined based on one or more of an archive of one or more historical events or one or more synthetic events. In some embodiments, one or more training high dimensional event vectors may be generated based on the one or more training events. In some embodiments, the one or more detection models may be generated based on the one or more training high dimensional event vectors.

In one or more of the various embodiments, one or more deficient detection models may be determined based on the one or more feedback metrics associated with the report such that the one or more feedback metrics indicate an ineffective determination of the one or more anomalous events. In some embodiments, the one or more deficient detection models may be retrained based on one or more other events such that the one or more retrained detection models determine one or more other anomalous events.

In one or more of the various embodiments, one or more training events based on one or more categories associated with one or more activity features such that the one or more activity features include one or more of an associated user, an associated user type, an associated resource, an associated resource type, an associated application, an associated application type, a geographic location, a time of day, a day of week, a time window, an associated application command, or the like.

In one or more of the various embodiments, a portion of the one or more detection models may be generated based on the one or more categorized training events such that the portion of the one or more detection models may be associated with the one or more categories. In some embodiments, one or more portions of the one or more anomalous events associated with the one or more categories may be determined based on the portion of one or more detection models and the one or more high dimensional event vectors.

In one or more of the various embodiments, determining the one or more anomalous events based on the one or more detection models may include: determining one or more other detection models that may be included as sub-models of the one or more detection models based on the one or more detection models; comparing the one or more high dimensional event vectors to the one or more other detection models to determine the one or more anomalous events; or the like.

In one or more of the various embodiments, determining the one or more anomalous events based on the one or more detection models may include: employing two or more detection models to evaluate the one or more high dimensional event vectors; determining the one or more anomalous events based on a comparison of the two or more evaluations such that one or more differences in the evaluations indicate an anomalous event; or the like.

In one or more of the various embodiments, determining the one or more anomalous events based on the one or more detection models may include: determining the one or more detection models associated with the one or more anomalous events such that each of the one or more detection models may be associated with one or more partial priority scores and such that each of the one or more detection models may be associated with one or more partial confidence scores; determining a final priority score for each anomalous event based on a sum of the one or more partial priority scores; determining a final confidence score for each anomalous event based on a sum of the one or more partial confidence scores; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
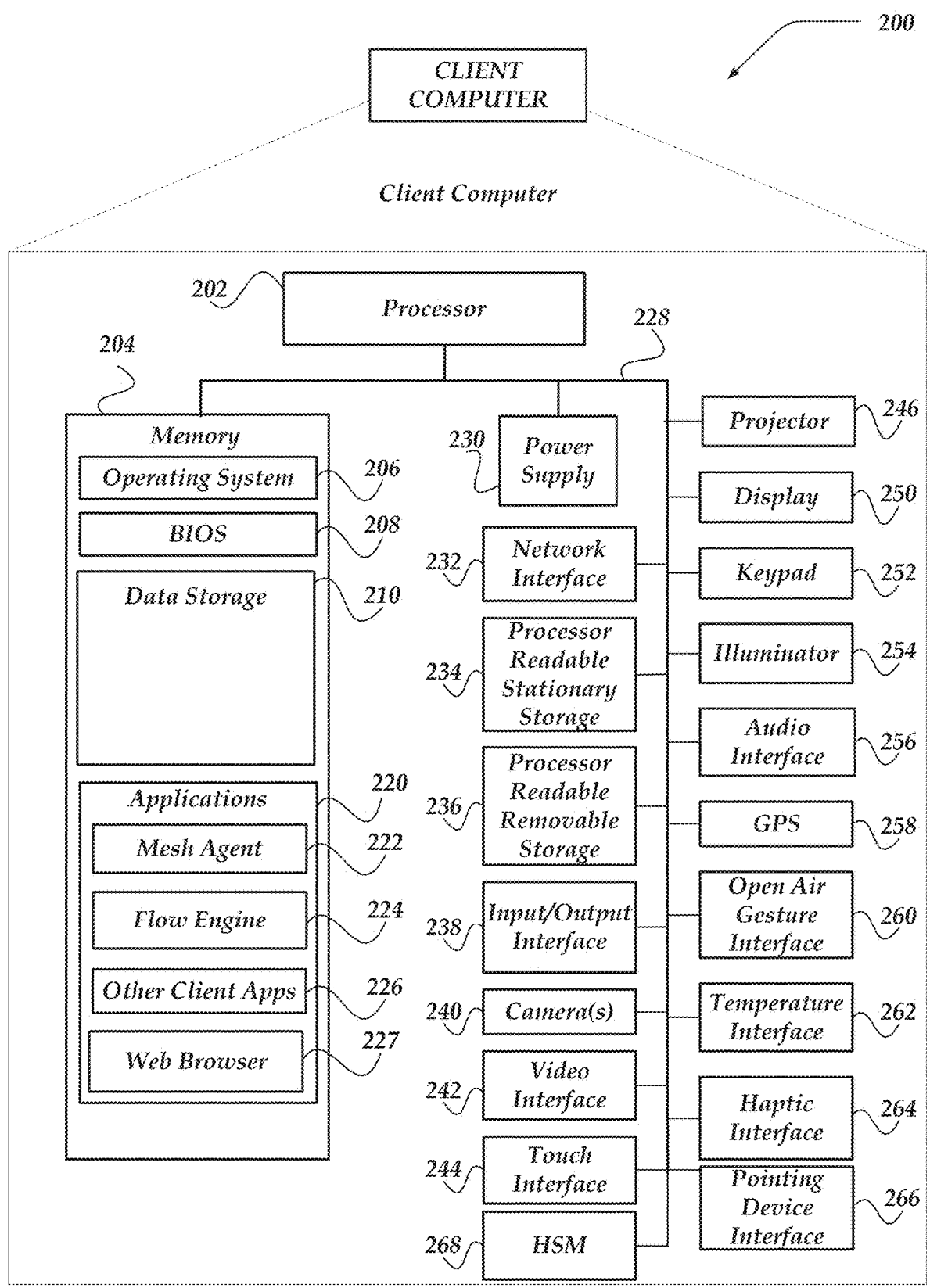
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, flow engine 224, other client applications 226, web browser 227, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
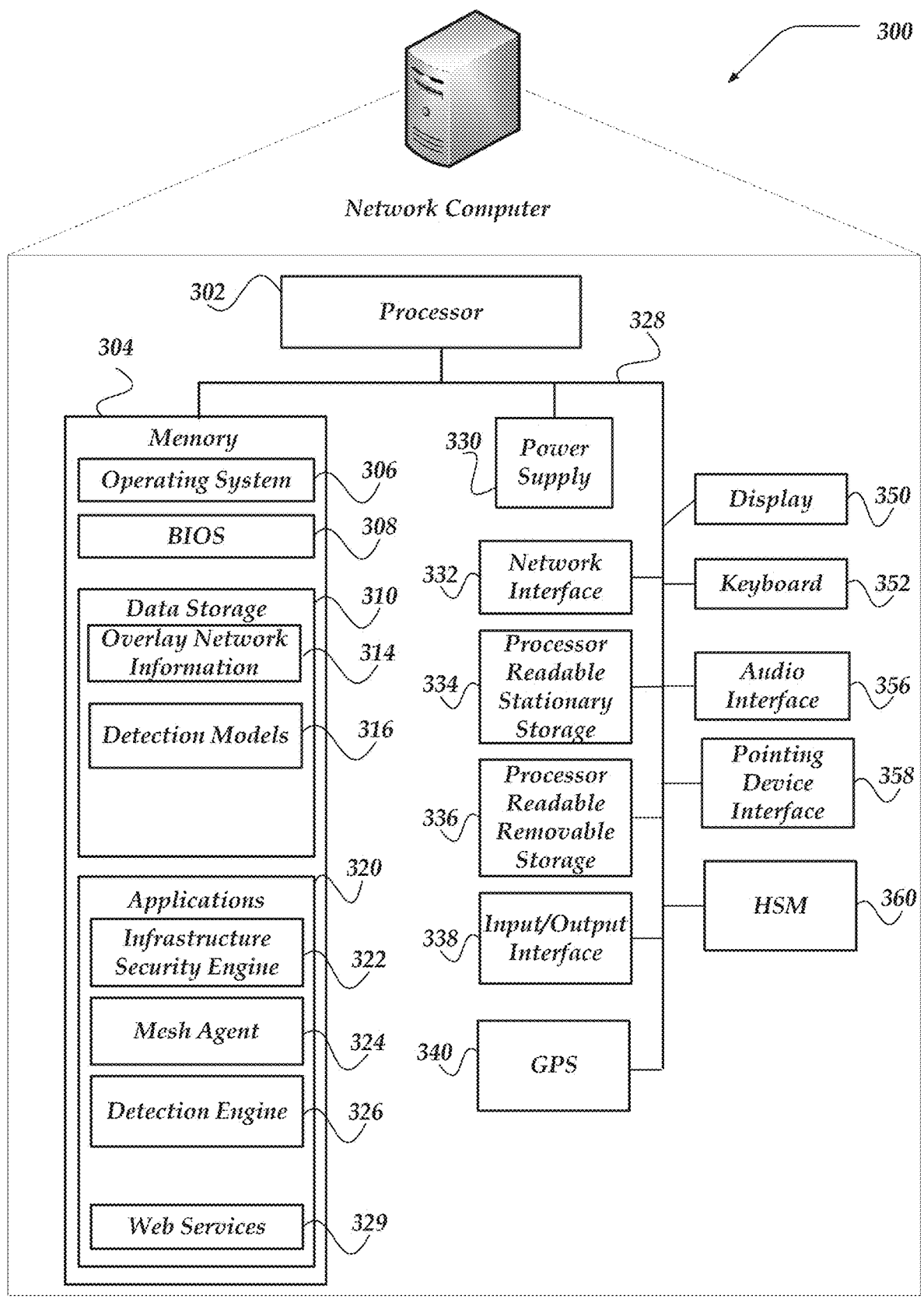
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for managing interactions with applications in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, detection engine 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, detection models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, detection engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, detection engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, detection engine 326, web services 329, or the like, may be provisioned and de-commissioned automatically.

Also, in one or more of the various embodiments, infrastructure security 322, mesh agent 324, detection engine 326, web services 329, or the like, may be located in virtual servers running in a cloud-based computing environment rather than being tied to one or more specific physical network computers. Likewise, in some embodiments, one or more of infrastructure security engine 322, mesh agent 324, detection engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
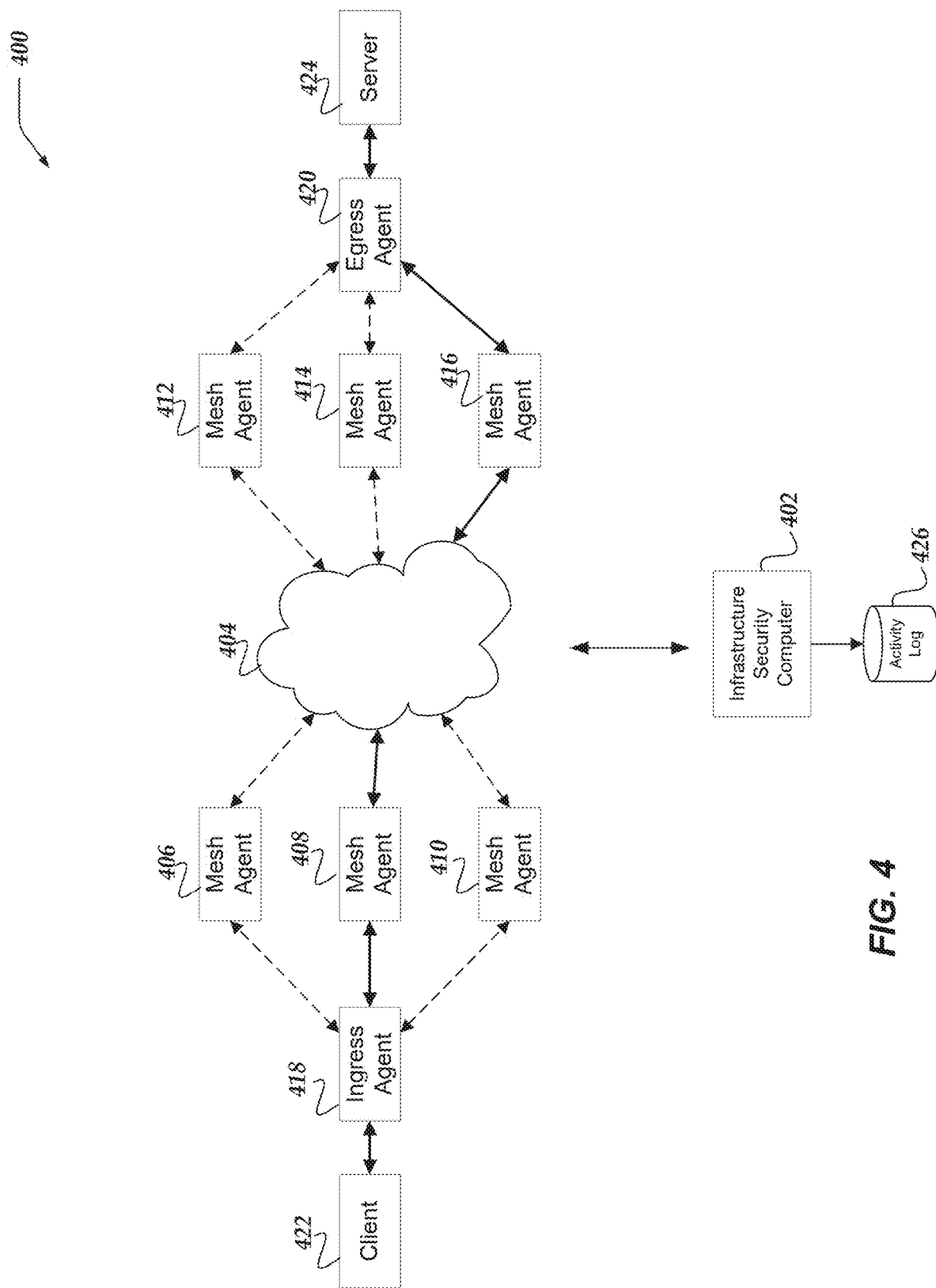
FIG. 4 illustrates a logical architecture of a system for anomaly detection in managed networks in accordance with one or more of the various embodiments.

FIG. 4 illustrates a logical architecture of system 400 for evaluating security policies in aggregate in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce policies for a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In some embodiments, infrastructure security computers may be arranged to authorize or enable requests based on one or more policies (e.g., security policies) that may be defined for various resources or activities in the managed network. Accordingly, in some embodiments, infrastructure security computers or other services may provide one or more tools or applications for defining or managing policies.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may be associated with the communication through the secure tunnel. In this example, for some embodiments, activity log data store 426 represents a data store for storing logged or recorded activity for managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
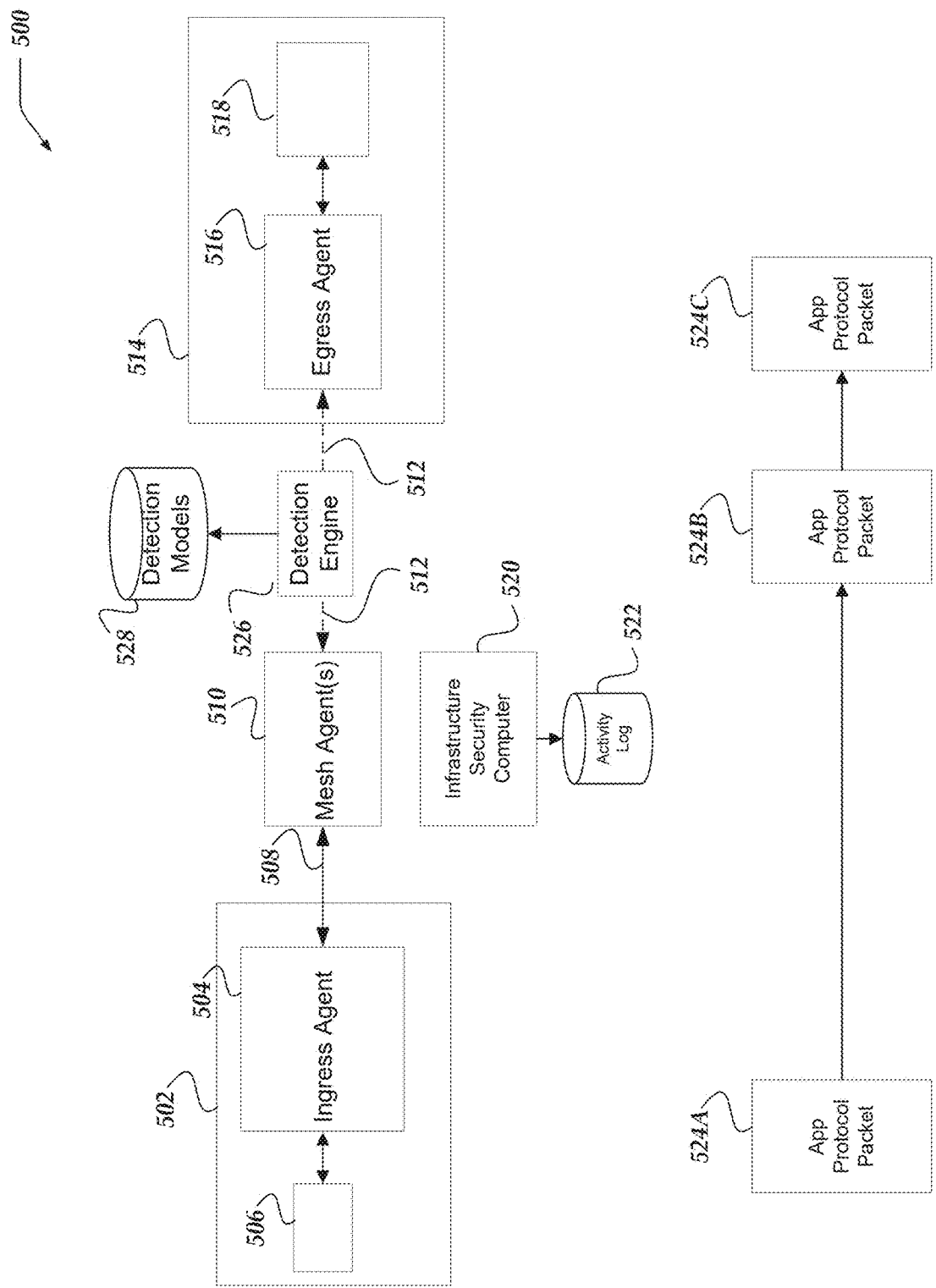
FIG. 5 illustrates a logical schematic of a system for anomaly detection in managed networks in accordance with one or more of the various embodiments.

FIG. 5 illustrates a logical schematic of system 500 for evaluating security policies in aggregate in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to function as an endpoint to the connection from the client application.

In this example, for some embodiments, application protocol packet 524A represents one or more packets of network traffic that may be sent from a client application, such as client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet 524 (A, B, C) represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represents a modified packet that includes credential information as well as other packet modifications that may be required for a particular application protocol or credential mechanism.

Figure 6:
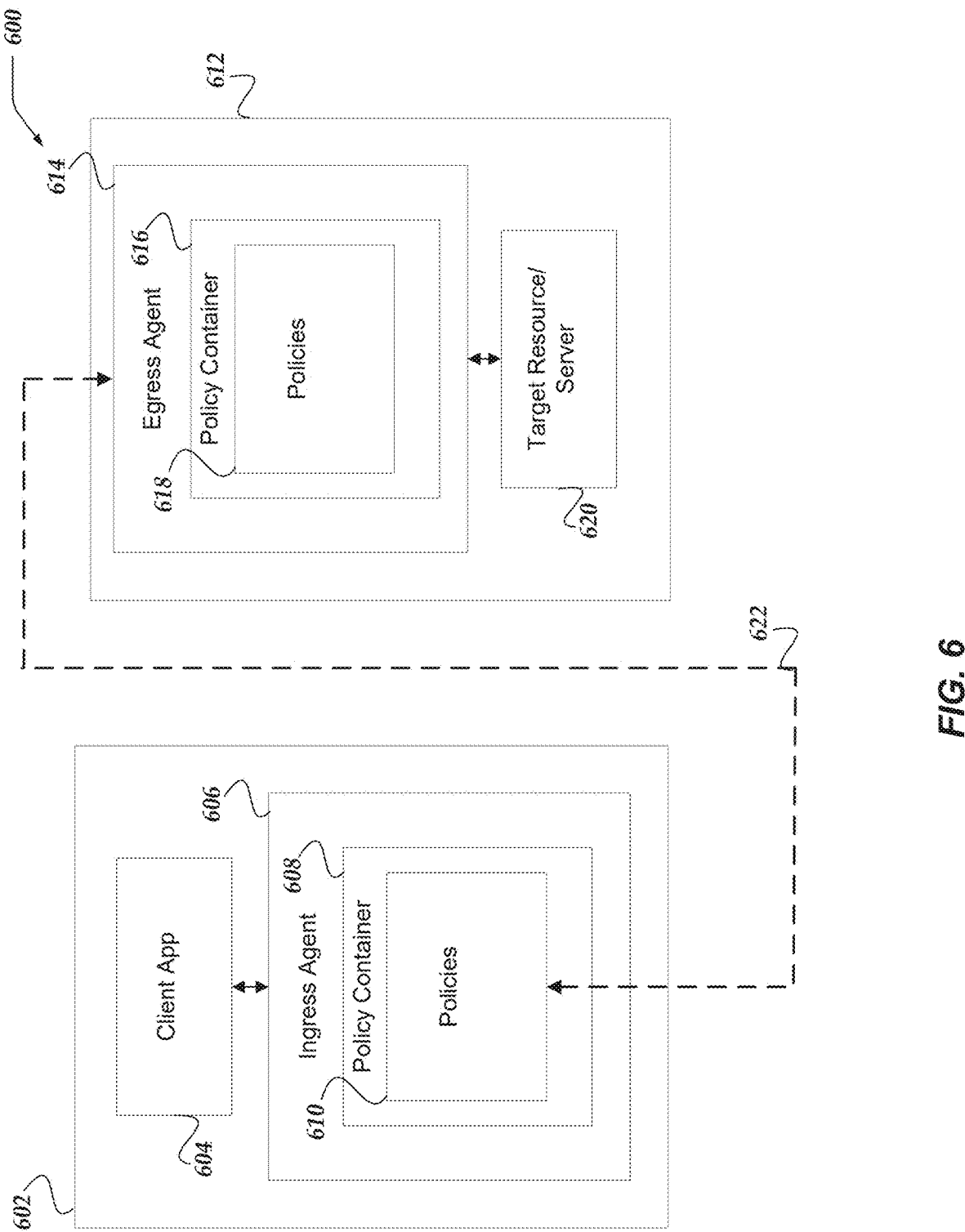
FIG. 6 illustrates a logical schematic of system for anomaly detection in managed networks in accordance with one or more of the various embodiments.

FIG. 6 illustrates a logical schematic of system 600 for evaluating security policies in aggregate in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

Figure 7:
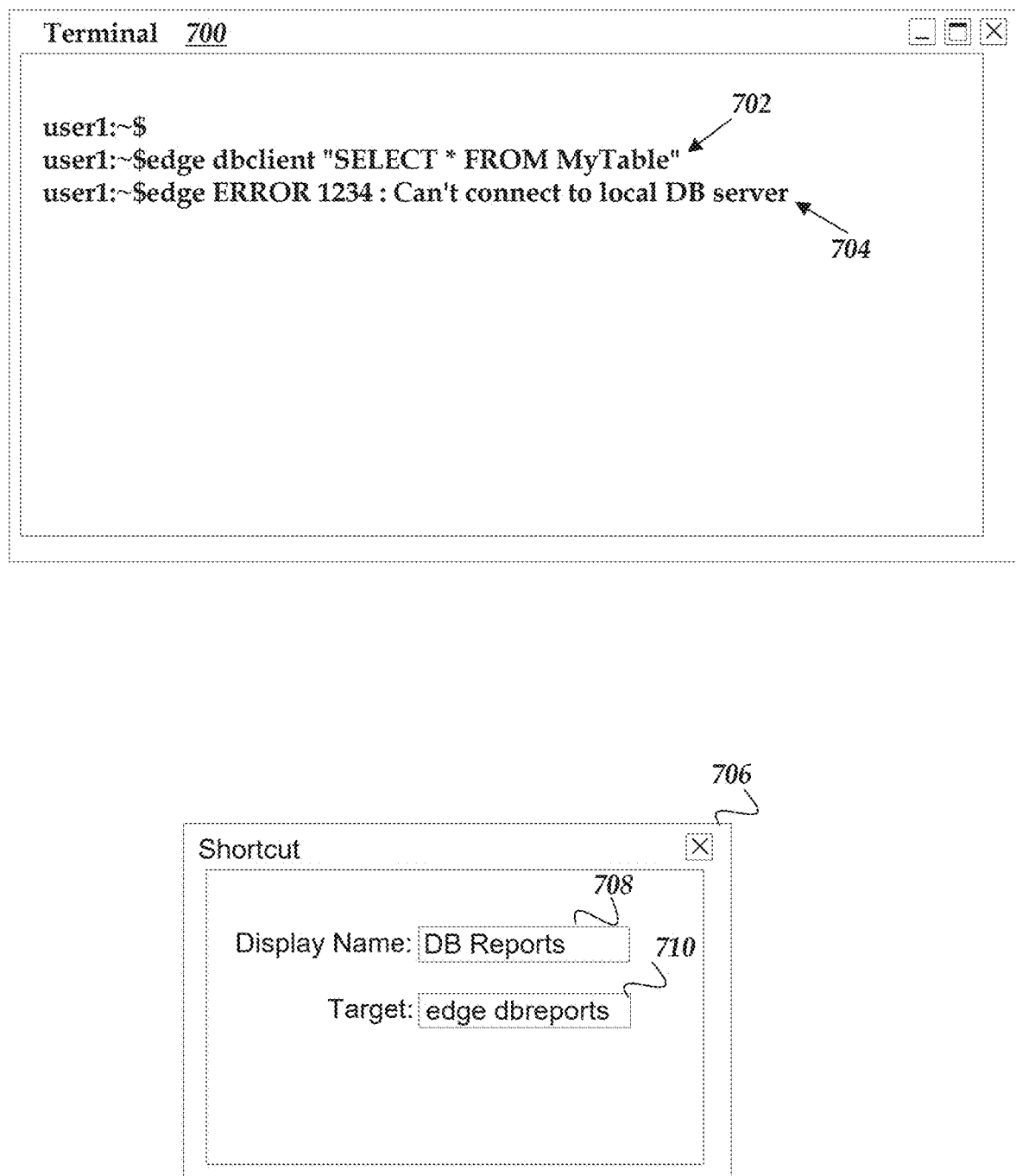
FIG. 7 illustrates a logical schematic of a terminal and shortcut 706 for anomaly detection in managed networks in accordance with one or more of the various embodiments.

FIG. 7 illustrates a logical schematic of terminal 700 and shortcut 706 for evaluating security policies in aggregate in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
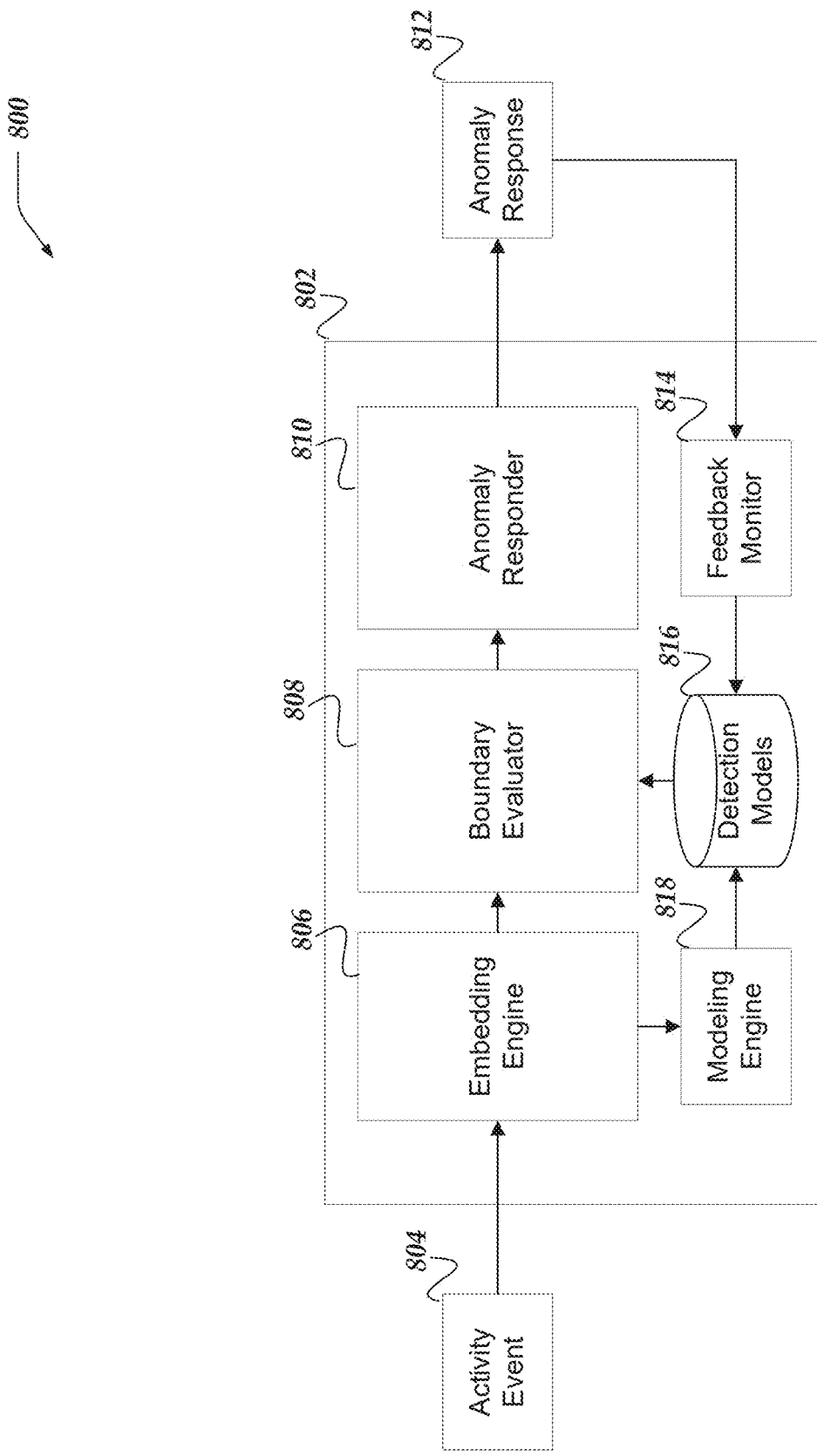
FIG. 8 illustrates a logical schematic of a system for anomaly detection in managed networks in accordance with one or more of the various embodiments.

FIG. 8 illustrates a logical schematic of system 800 for anomaly detection in managed networks in accordance with one or more of the various embodiments.

In some embodiments, detection engines, such as detection engine 802 may be provided one or more activity events (e.g., events), such as activity event 804. Accordingly, in some embodiments, activity events may be provided to embedding engines, such as embedding engine 806. In some embodiments, activity events may be arranged to generate event vectors that represent the activity events. Accordingly, in some embodiments, embedding engines may be arranged to provide event vectors to boundary evaluators, such as boundary evaluator 808. Thus, in some embodiments, if activity events may be determined to be anomalous events, anomaly responders, such as anomaly responder 810 may be arranged to determine an appropriate anomaly response, anomaly response 812, based on the detection or observation of an anomalous event. Also, in some embodiments, detection engines may include feedback monitors, such as feedback monitor 814 that may be arranged to collect information or metrics associated with how users or other services may interact with anomaly responses. Accordingly, in some embodiments, detection engines may be arranged to automatically evaluate the performance or efficacy of one or more detection models (e.g., detection models 816). Further, in some embodiments, detection engines may be arranged to include modeling engines, such as modeling engine 818 for generating or retraining detection models.

In some embodiments, as described above, mesh agents, ingress agents, infrastructure security computers, or the like, may be arranged to monitor or evaluate various activities that may occur in managed networks. In some embodiments, activities that occur in such networks may be associated with one or more activity events, such as activity event 804. In some embodiments, activity events may include the commands, user identifiers, target resource identifiers, source resource identifiers, security credentials, action identifiers, application identifiers, various context information, or the like. In some embodiments, context information may include arbitrary information, such as timestamps, geographic locations, additional user information (e.g., user role, or the like), organizational information (e.g., department, office building, company name, or the like), priority flags, quality of service (QOS) indicators, sensitivity indicators (e.g., indication that PII may be associated with an activity), or the like, that an organization may determine to be advantageous to be included in an event.

In some embodiments, mesh agents, or other sources, in managed networks may be assumed to continuously generate activity events to facilitate policy enforcement in managed networks. Accordingly, in some embodiments, in addition to activity events associated with activities in the managed networks, activity events may be generated for activities that may be associated with facility management system (building management systems), physical security systems, various physical sensors, or the like. For example, in some embodiments, activity events may be generated if particular doors may be opened or closed, and so on.

In one or more of the various embodiments, embedding engines, such embedding engine 806 may be arranged to transform the information include activity events into a high-dimensional feature vectors. One of ordinary skill in the art will be familiar with various embedding methods that may be commonly used for converting text or other non-numeric inputs into numerical representations. In some embodiments, detection engines may be arranged to be adaptable to changes or improvements in embedding techniques. Accordingly, in some embodiments, detection engines may be arranged to determine the particular embedding system based on configuration information to account for local requirements or local requirements.

Further, in some embodiments, detection engines may be arranged to select different embedding engines (or embedding models or embedding libraries employed therein) for different types of activity events or other considerations. For example, in some embodiments, faster or lower dimensional embedding models may be employed for some activity events or activity event types. Likewise, in some embodiments, embedding models may be selected based on resource costs, throughput, or the like. For example, in some cases, some activity events may occur at faster rates than others such that it may be advantageous to employ faster embedding models. Likewise, some activities may inherently have fewer characteristics or features such that higher dimensional embeddings may be unnecessary.

Also, in some embodiments, detection engines may be arranged to accepted complete or raw activity events as long as they may be compatible with the embedding engine. Accordingly, in some embodiments, feature engineering or feature selection may be omitted since the complete contents of the activity events may be converted to feature vectors rather than selecting particular fields or portions from the activity events. Accordingly, in some embodiments, organizations may be relieved from guessing or predicting which features of activity events or classes of activity events may be considered relevant for anomaly detection in managed networks. Also, in some embodiments, embedding whole activity events may relieve organizations from updating system components as new activity events may be encountered. Likewise, some organizations may include different fields or context information in their activity events than other organizations.

In some embodiments, boundary evaluators, such as boundary evaluator 808 may be arranged to compare event feature vectors generated from activity events to different subject profiles (not shown here). In some embodiments, subject profiles may be data structures that represent the n-dimensional volume defined by a cluster of feature vectors that may be associated with a particular subject. In some embodiments, subjects may include users, resources, locations, user types, resource types, locations, general events, or the like.

Accordingly, in some embodiments, boundary evaluators may be arranged to determine if the feature vector generated from an activity event may be consistent with the subject profiles for the subjects of interest. For example, if a subject profile represents a volume in the feature space, feature vectors that are inside the profile volume may be considered normal or otherwise non-anomalous. In contrasts, in some embodiments, features vectors that may be determined to be outside of the relevant profile volumes may be considered anomalous. In some embodiments, boundary evaluators may be configured such that there may be threshold distances such that near-misses may be considered non-anomalous (e.g., normal) if they remain within the variance thresholds defined for a given profile volume.

In some embodiments, boundary evaluators may be configured to employ one or more heuristics or rules for determining if a feature vector may be out of bounds of a profile volume. For example, in some embodiments, one or more conventional similarity methods such as cosine distance, euclidean distance, Mahalanobis distance, or the like. Also, in some embodiments, boundary evaluators may be arranged to be adaptable to changing or new discovered similarity/distance methods. Accordingly, in some embodiments, detection engines may be arranged to determine the particular similarity/distance functions based on rules, libraries, instructions, or the like, provided via configuration information to account for local circumstance, local requirements, or changing methodologies.

Also, in some embodiments, detection engines may be arranged to enable different similarity thresholds (or similarity functions) for different subjects or subject types. For example, in some embodiments, organizations may assign stricter tolerances for more sensitive subjects. Generally, in some embodiments, organizations may assign similarity thresholds or similarity functions to various subjects or subject types for managed networks using infrastructure security computers, or the like.

In some embodiments, detection engines may be arranged to enable profile volumes directed to different scopes or time windows (e.g., year, month, day, hours, or the like).

Also, in some embodiments, detection engines may be arranged to include anomaly responders, such as anomaly responder 810 for determining the type of response that may be generated for a given anomaly determination. Generally, in some embodiments, detection engines may be arranged to employ rules, instructions, libraries, or the like, provided via configuration information to determine particular responses for particular anomalies or types of anomalies. Accordingly, in some embodiments, different organizations may define different responses for anomalies or anomaly types that may occur in their networks.

In this example, for some embodiments, anomaly response 812 represents the responses determined or generated by anomaly responder 810. In some embodiments, anomaly responders may vary user interface notification/highlighting, log record generation, notification messages, notifications/reports displayed in a dashboard user interface, SMS texts, or the like. Also, in some embodiments, anomaly responders may include events or messages that may conform to another service or system that may be provided the anomaly responses. For example, in some embodiments, detection engines may be arranged to integrate with one or more external or third-party systems that may be configured to receive such messages, such as a Security Information and Event Management (SIEM) system, or the like.

In some embodiments, infrastructure security computer or other system may be arranged to provide one or more user interfaces that enable users or administrators to interact with anomaly responses. For example, in some embodiments, such user interfaces may provide user interface controls that enable users to grade or score anomaly responses. Likewise, in some embodiments, user interfaces may be arranged to track if or how users may react or respond to particular anomaly responses. For example, in some embodiments, detection engines may be arranged to track if users dismiss anomaly responses or if users initiate some mitigation activity associated with anomaly responses. Accordingly, in some embodiments, detection engines may be arranged to collect metrics based on active user interactions (e.g., scoring, grading, or the like) as well as passive telemetry based on observing how users react to particular anomaly responses.

In some embodiments, detection engines may be arranged to include feedback monitors, such as feedback monitor 814 for collecting or evaluating various feedback information associated with anomaly responses. For example, in some embodiments, if certain anomaly responses may be regularly ignored by users, it may indicate that one or more of the boundary evaluation or anomaly responder may be incorrect for the activity events associated with those anomaly responses.

In some embodiments, detection models represent here by detection models 816 may be data structures that include or define profile volumes for various subjects. In some embodiments, detection engines or infrastructure security computers may be arranged to enable detection models to be trained based on archived or historical activity events. Accordingly, in some embodiments, profile volumes for various subjects may be generated in advance. For example, an archived or simulated set of training activity events may be used to generate feature vectors that may be employed to define profile volumes for the subjects associated with training activity events.

Also, in some embodiments, detection engine may be arranged to enable detection models to be organically developed as activity events may be encountered during the operation of managed networks. In some embodiments, detection engines may be arranged to enable general purpose or generic detection models that may be trained for more than one subject. Accordingly, in some embodiments, activity events may be determined to be anomalous if their feature vector does not fit within a known profile volume. Also, in some embodiments, detection models may be generated for particular subjects, such as users, user types, resources, resource types, actions, or the like.

In some embodiments, a general detection models may be trained for many types of subjects rather than being trained for particular subjects. Further, in some embodiments, detection engine may be arranged to enable two or more detection models to be included or composed into a single detection model. Accordingly, in some embodiments, more than one detection model may be combined into a single model that boundary evaluators may employ to evaluate incoming activity event feature vectors In some embodiments, detection engines may be arranged to include modeling engines, such as modeling engine 818 for modeling or retraining detection models. In some embodiments, modeling engines may be considered to be part of detection engines or as sub-systems that may be operated independently from detection engines. For example, in some embodiments, in some circumstances, modeling engines may be configured to operate concurrent with live/production operations of detection engines. Likewise, for example, in some circumstances modeling engines may be configured to operate in an offline mode. In some embodiments, modeling may include generating or updating detection models based on archived or simulated events such that training events may be transformed into vectors that may be employed to generate profile volumes in detection models. Also, in some embodiments, as 'live' activity events may be processed in real-time, modeling engines may be arranged to sample some of the activity events based on various criteria to generate profile volumes or candidate/alternate detection models. Accordingly, in some embodiments, a number of detection models may be generated initially and then as live activity events are encountered, modeling engines may be employed to generate new models or update existing models based on the live event streams.

In some embodiments, detection models may be represented in various ways depending on the type of metrics that may be used for distinguishing anomalous activity from the non-anomalous activity based on where event vectors may occur in feature space. In some cases, in some embodiments, detection engines may be configured with detection models that employ one or more statistics, heuristics, machine-learning classifiers, or the like, or combination thereof. For example, as described above, detection models may be trained based on clusters or groups of event vectors such that distance or deviation away from the center of a given cluster or group may indicate if an event vector may be considered to be associated with an anomalous activity event. Likewise, in some embodiments, detection models may include other criteria for determining if an event vector may be anomalous. In some embodiments, as discussed above, detection models may be comprised of more than one sub-model that may contribute to determining if an event vector indicates an anomalous activity event. Accordingly, as mentioned, detection models (or rules/instructions of for training them) may be loaded from configuration information to enable detection engines to easily employ different types of detection models. Also, this adaptability enables detection engines to updates to employ detection models that may be determined based on observation of the results of the current detection models or by deliberate experimentation.

Further, in some embodiments, detection engines may be arranged to compare results from two or more detection models or combine the results from two or more detection models to determine if events may be anomalous. Accordingly, in some embodiments, some detection models may be configured as envelope models that include or combine results from two or more other models. For example, in some embodiments, a detection model may be configured to produce results/inferences based on partial results each produced by other detection models.

In some embodiments, detection models may be configured to associate various scores, such as confidence score, priority scores, or the like, to anomalous events. In some cases, some detection models may include two or more sub-components, partial functions, sub-models, or the like, that may be associated with partial scores that may be summed to produce final score.

Accordingly, in some embodiments, detection engine may be arranged to provide user interfaces that enable users to view or interact with anomalous events based on the scores associated with the results. For example, in some embodiments, an event dashboard user interface may include user interfaces for ordering or filtering events based on priority scores, confidence score, or the like.

In some embodiments, detection engines may be arranged to assign scores or partial scores to anomaly determinations based on features of the underlying activity events, such as resource criticality, user type, activity type, or the like. Accordingly, in some embodiments, infrastructure security computers or detection engines may provide user interfaces that enable administrators to assign scores or score indicators (e.g., priority codes, criticality indicators, or the like) to various entities or actions managed in the network.

Figure 9:
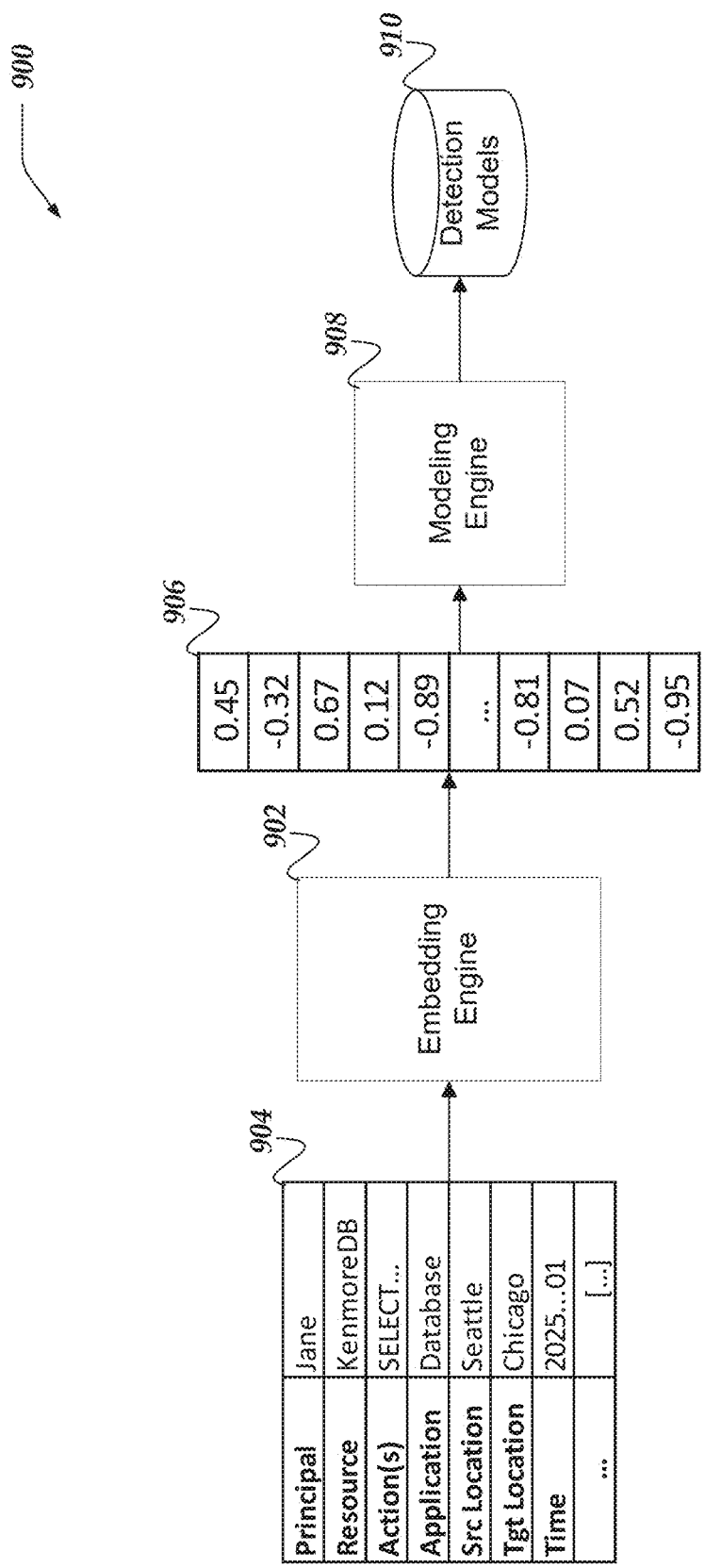
FIG. 9 illustrates a logical schematic of a system for anomaly detection in managed networks in accordance with one or more of the various embodiments.

FIG. 9 illustrates a logical schematic of system 900 for anomaly detection in managed networks in accordance with one or more of the various embodiments.

As introduced above, in some embodiments, embedding engines, such as embedding engine 902 may be provided one or more events, such as event 904. Accordingly, in some embodiments, embedding engine 902 may be arranged to generate an event vector, such as event vector 906 based on event 904. In some embodiments, modeling engines, such as modeling engine 908 may be arranged to generate detection models, such as detection models 910 based on event vectors, such as event vector 906.

In some embodiments, activity events, such as activity event 904 may include several fields or attributes that include values, data, or information associated with an activity. In some embodiments, some portions of an activity event may include structured data, such as labeled fields containing values, such as network address, user agent indicators, user identifiers, time information, resource identifiers, or the like. Also, in some embodiments, identifiers may include type identifiers for associated entities, actions, users, resources, or the like. Further, in some embodiments, activity events may include natural language descriptions or labels directed to users that may be the intended audience for activity events. Accordingly, in some embodiments, detection engines may be provided the entire activity event, including fields or information directed to users, such as natural language descriptions or narratives that may be accompanying or included in activity events. Note, for brevity or clarity, the various fields/attributes illustrated for activity event 904 are unreferenced. One of ordinary skill in the art will appreciate that various field labels, field values, or the like may vary depending on the particular activity event or source of activity event. Likewise, even though activity event 904 is represented using a table-like data structure, these innovations are not so limited. Accordingly, other data structures or data formats may be employed to represent activity events, including JSON objects, XML, database tables, other script objects, structures, lists, arrays, hashes, or the like depending on circumstances. However, one of ordinary skill in the art will appreciate that detection engines may be arranged to deserialize or flatten activity event data structures such that they may conform to the input requirement for embedding engines, such as embedding engine 902.

In some embodiments, whole activity events may be employed to generate event vectors. In some embodiments, detection engines may be arranged to treat the whole activity event as a single token that may be transformed into a single event vector rather than using selective feature engineering. In contrast, selective feature engineering may rely on users/designers choosing/predicting which fields or characteristics of a given activity event may be important or useful for generating detection models. In some cases, selective featuring engineering may introduce biases or eliminate distinctive features of activity events from consideration that may be disadvantageous for creating quality detection models.

In some embodiments, detection models may be one or more data structures that represent one or more volumes in the event space of the events or event vectors. In some embodiments, event vectors determined to be within the volume of a detection model may generally be expected to be associated with non-anomalous operations. Though, in some cases, for some embodiments, detection engines may be arranged to enable inverted detection models such that events producing event vectors that fall within inverted detection models may be considered anomalous. In some embodiments, training detection models may include generating event vectors based on historical/archived events or simulated events with the expectation that activity events that may be similar may be event vectors that may be somewhat similar. Thus, in some embodiments, modeling engines may be arranged to determine detection model volumes based on the location of event vectors that may be associated with similar or related activity events.

In some embodiments, modeling engines may be configured to generate detection models for various targets or subjects. In some embodiments, individual detection models may be generated for different types of events. For example, in some embodiments, events associated with particular users or user types may be employed to generate detection models for those users or user types. Likewise, for example, events associated with various resources, actions, locations, applications, activities, or the like, may be employed to generate one or more particularize detection models. Further, in some embodiments, detection models may be comprised of more than one detection model. In some cases, for some embodiments, detection models may be arranged hierarchically such that a detection model that may be generated for larger classes of events may include or encompass one or more smaller (more narrowly defined) detection models that have a smaller scope than the enclosing or superior detection models. Detection models are further described below.

Accordingly, in some embodiments, training activity events may be categorized based on one or more categories associated with one or more activity features such that the one or more activity features include one or more of an associated user, an associated user type, an associated resource, an associated resource type, an associated application, an associated application type, a geographic location, a time of day, a day of week, a time window, or an associated application command, or the like. In some embodiments, one or more detection models may be trained based on the categorized training activity events such that some of detection models may be associated with the categories. Thus, in some embodiments, such detection models may be employed to determine anomalous activity events associated with the one or more categories.

In some embodiments, modeling engines may be configured to employ one or more clustering or grouping methods to generate event volumes from event vectors. In some embodiments, detection models may be associated with meta-data that identifies the cluster methods or method version that were used generate the detection model. Accordingly, in some embodiments, detection engines may be arranged to be adaptable to various clustering methods that may be selected for various reasons. In some embodiments, detection engines may be arranged to enable clustering methods to be determined experimentally based on various criteria, such as precision, detection performance, operational performance criteria (e.g., compute, storage, speed, or the like), or the like. In some cases, for some embodiments, detection models for different targets or subjects may be generated using different clustering methods. Thus, in some embodiments, detection engines may be arranged to employ rules, instructions, libraries, or the like, provided via configuration information to determine the particular clustering methods to employ for a given event, detection model, or the like to account for local circumstances, preferences, or requirements.

Similarly, in some embodiments, detection engines may be arranged to be readily adaptable to different embedding methods. Accordingly, in some embodiments, detection engines may be arranged to employ rules, instructions, libraries, or the like, provided via configuration information to determine the particular embedding methods to employ for a given event, detection model, or the like to account for local circumstances, preferences, or requirements.

Further, in some embodiments, embedding engines, modeling engines, or the like, may be considered to be included in detection engines. In some embodiments, embedding engines or modeling engines may be components or features included in detection engines. However, in some cases, for some embodiments, one or more of embedding engines, modeling engines, or the like, may be physically separate from detection engines. For example, one or more compute nodes in a computer cluster may be dedicated to embedding engines, modeling engines, detection engines, or the like. Also, as mentioned above, detection engines may similarly include boundary evaluators, anomaly responders, or the like. Accordingly, for brevity or clarity detection engines may be assumed to include one or more embedding engines, modeling engines, boundary evaluators, anomaly responders, feedback monitors, or the like. However, in some cases, for clarity the individual subcomponents described above may be referred to separately. Note, boundary evaluators, anomaly responders, or feedback monitors are not shown here as they are introduced in FIG. 8.

FIG. 10A, FIG. 10B, or FIG. 10C represent detection models 1000 for anomaly detection in managed networks in accordance with one or more of the various embodiments.

FIG. 10A illustrates visualizations of a multi-dimensional event space with detection models for anomaly detection in managed networks in accordance with one or more of the various embodiments. In some embodiments, event space 1002 may be considered a simplified representation of a dimensional space corresponding to the number of dimensions in event vectors generated by embedding engines. In this example, for brevity and clarity three axes are shown. However, one of ordinary skill in the art will appreciate that event vectors may have many more dimensions (hundreds or thousands) depending on the particular embedding method used by the detection engine.

In this example, event space 1002 is shown with detection model 1004, detection model 1006, and detection model 1008. Here, the detection models are represented as three dimensional spheres. However, in practice detection models may have many more dimensions and would be considered to be n-spheres where n implies the number dimensions. Also, in some embodiments, detection engines may be arranged to generate detection models that use other shapes, such as polytopes, n-ellipsoids, n-cubes, or the like, depending on the configuration of the modeling engines used for generating the detection models. For brevity and clarity detection models are represented as spheres.

As described above, in some embodiments, detection engines may include boundary evaluators that may test or otherwise determine if a point in the event space as determined by an event vector falls inside or outside a detection model.

Further, in some embodiments, one or more detection models may be combined into one detection model. For example, in some embodiments, detection engines may be arranged to train detection models for more than one resource or user that may be combined into a single detection model. For example, in some embodiments, a detection model that represents all the databases in the managed network may be trained such that it may include one or more sub-models each associated with a particular database.

Also, such that the detection model may not be associated with a particular type of activity event rather than training it for particular types of events. For example, detection models may be trained using a variety of activity events, which may result in a variety of event clusters that may be combined into a single detection model. For example, FIG. 10A may be considered to represent a combined detection model that includes multiple sub-detection models associated with more than cluster of events. Accordingly, in some embodiments, an event may be determined to be non-anomalous if it is determined to be within any of the sub-detection model clusters. Thus, in some embodiments, detection engines may be arranged to train generic detection models that are not trained for particular types of events, event targets, event subjects, users, activities, resources, or the like.

FIG. 10B illustrates a 2-D visualization of detection model 1010 for anomaly detection in managed networks in accordance with one or more of the various embodiments. In this example, for some embodiments, detection model 1010 may represent a volumetric representation of a detection model. Accordingly, in some embodiments, event vector 1012 may be considered to represent an event that that may be considered outside of the boundary of detection model 1010. Likewise, for some embodiments, event vector 1014 may be considered to represent an event vector that is within the boundary of detection model 1010. In some embodiments, detection models may be trained to such that event vectors that fit within the detection model boundary may be considered normal or non-anomalous and event vectors that fall outside the detection model boundary may be considered anomalous. Also, in some embodiments, other detection models may be trained such that event vectors that fall within the detection model boundary may be considered anomalous while event vectors that fall outside of the detection model boundary may be considered non-anomalous.

In some embodiments, for brevity and clarity, detection model volumes are described or represented as shapes with boundaries such that event vectors that are inside a boundary may be considered non-anomalous. However, one of ordinary skill in the art will appreciate that boundaries may be determined using various methods for determining if vectors may be included in clusters or groups. For example, in some embodiments, detection engines may be configured to employ distance-based or similarity-based functions (Euclidean distance, or the like) for measuring a distance from the center/centroid of a cluster of points corresponding to detection models. Also, for example, detection engines may be arranged to employ similarity-based functions (Euclidean distance, cosine similarity, or the like) measuring if event vectors may be similar to one or more vectors represented in detection models.

Also, in some embodiments, detection engines may be arranged to be adaptable to the introduction or new or modified methods for evaluating if an input event may be considered part of a group or cluster (as represented by detection models). Accordingly, in some embodiments, detection engines or boundary evaluators may be configured to employ rules, instructions, libraries, or the like, for determining if an event vector may be considered to fit within a detection model to enable adaptability or in response to local circumstances or local requirements. For example, in some embodiments, detection engines may be configured to employ faster detection methods in high performance environments event though they may be less precise. Likewise, in some embodiments, detection engines may be configured to employ slower more precise detection methods for one or more particular sensitive environments, resources, or activities.

FIG. 10C illustrates a 2-D representation of training a detection model for anomaly detection in managed networks in accordance with one or more of the various embodiments. In this example, detection model 1012 may be determined based on archived or synthetic activity events (or combination thereof). Accordingly, in some embodiments, modeling engines may be arranged to determine detection models, such as detection model 1012 based on how associated activity events may cluster or group in the event space. In this example, for some embodiments, detection model 1010 may be determined based on which activity events have event vectors that are considered to be in a cluster or group that conforms to the detection model criteria. In this example, for some embodiments, event vector 1014 and the like represent an event vector used for determining detection model 1012. In contrast, for some embodiments, event vector 1016 may be considered to be an event vector provide during training that is not associated with detection model 1012.

Also, in some embodiments, FIG. 10C may be used to illustrate how incoming activity events may be tested against a detection model. For example, in some embodiments, event vector 1014 or the like (the event vectors inside detection model 1012) and event vector 1016 may be considered to be captured from real-time activity events during normal operations. Thus, in this example, the activity event associated with event vector 1016 may be considered anomalous because it may be determined to outside the bounds of detection model 1012.

Figure 11:
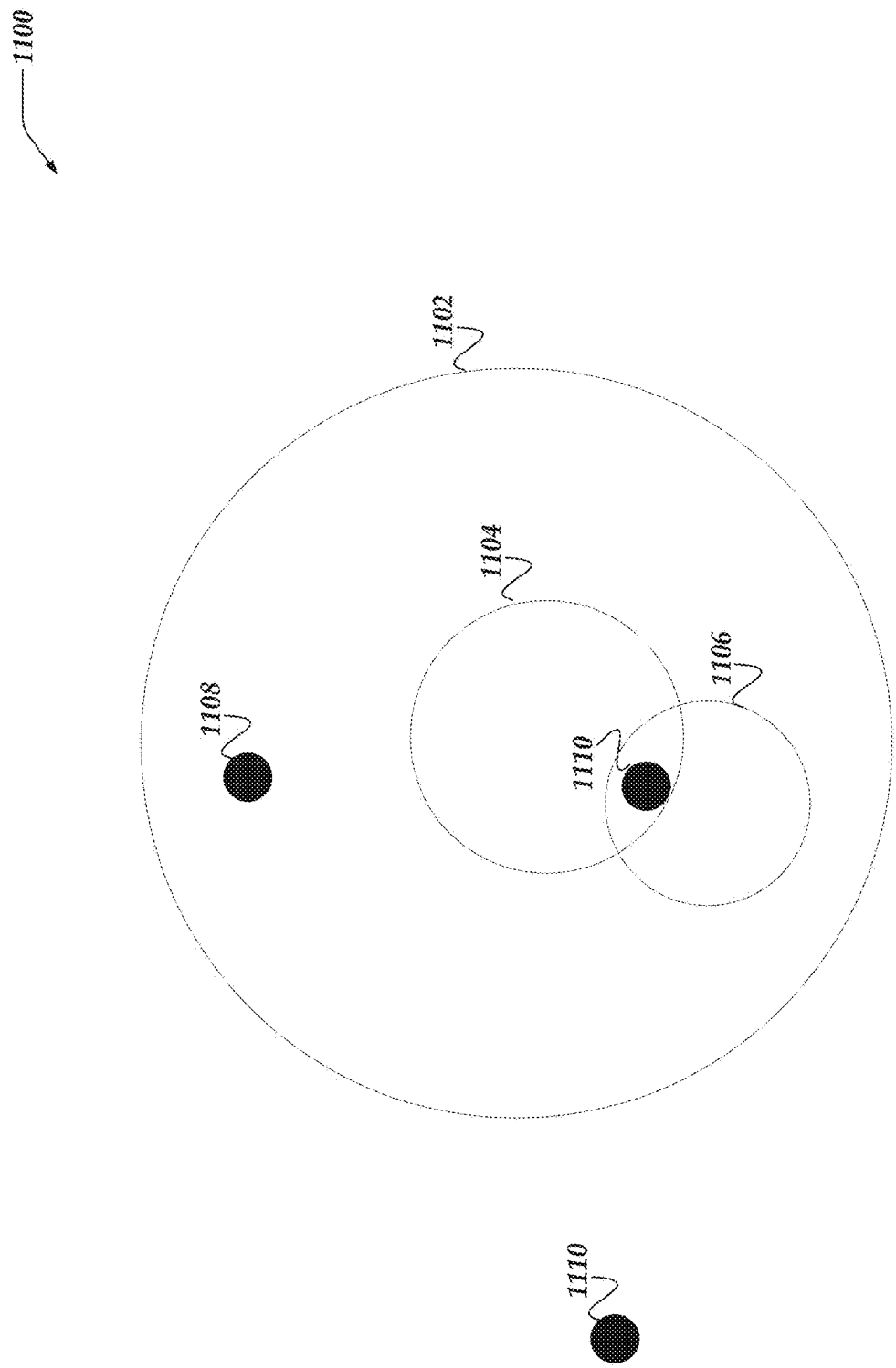
FIG. 11 illustrates a 2-D visualization of detection models for anomaly detection in managed networks in accordance with one or more of the various embodiments.

FIG. 11 illustrates a 2-D visualization of detection models 1100 for anomaly detection in managed networks in accordance with one or more of the various embodiments.

As described above, in some embodiments, detection models may be determined for different scopes or coverage. Also, in some embodiments, detection models may overlap with other detection models.

For example, in some embodiments, detection models 1102 may represent a detection model trained for all users while detection model 1104 or detection model 1106 may be trained for particular users or user types. Accordingly, in this example, event vector 1108 may indicate activity that is normal for any user while event vector 1110 may include activity that is normal for users associated with detection model 1106, detection model 1108, and detection model 1102. Further, in this example, event vector 1110 may be considered to represent activity that is not within a detection model and may be considered anomalous for all users.

Figure 12:
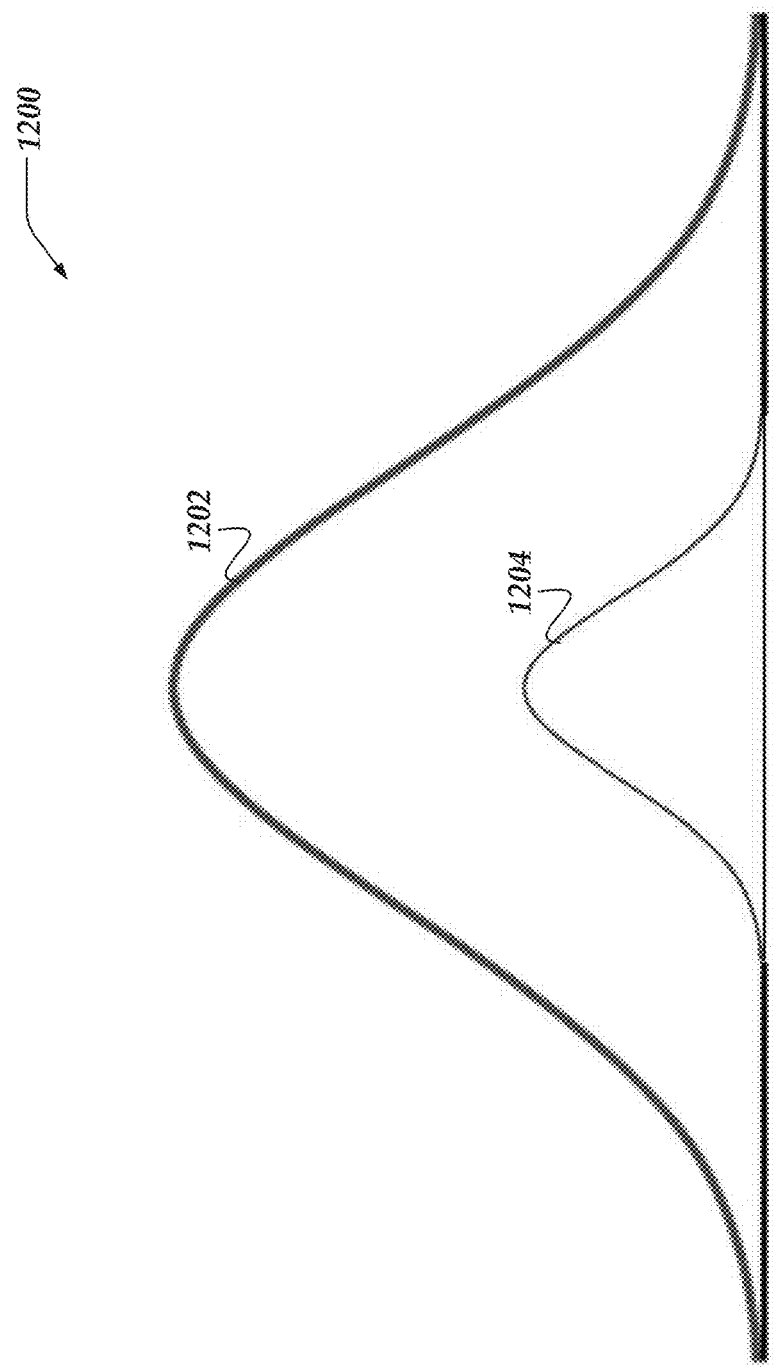
FIG. 12 illustrates a 2-D visualization of detection models for anomaly detection in managed networks in accordance with one or more of the various embodiments.

FIG. 12 illustrates a 2-D visualization of detection models 1200 for anomaly detection in managed networks in accordance with one or more of the various embodiments.

As described above, in some embodiments, detection models may be represented using different types of statistical or heuristic based models. In this example, for some embodiments, detection model 1202 and detection model 1204 represent detection models that employ Gaussian distribution curves to evaluate if event vectors may indicate that associated activity events may be anomalous.

Accordingly, in some embodiments, detection engines may be arranged to train detection models that employ one or more metrics associated with or determined from event vectors to generate distributions associated with the likelihood that associated activity events may be anomalous. Note, here axes labels or axis graduation indicators are omitted because the particular metrics may vary depending on the detection model, activity event type, or the like. Accordingly, in some embodiments, one of ordinary skill in the art may assume that the rules or instructions defining the detection models may include or identify the particular metrics being evaluated.

Also, in some cases, as described above, detection models for the same event vectors, event metrics, activity event types, or the like may have different scope. Accordingly, in this example, for some embodiments, detection model 1202 may be considered curves for the same or similar event types or event criteria but with different scope. For example, in some embodiments, detection model 1202 may represent a shorter time period where the occurrence of a feature may appear more random, while detection model 1204 may represent the same model criteria over longer time windows such that the results coalesce around different values.

Figure 13:
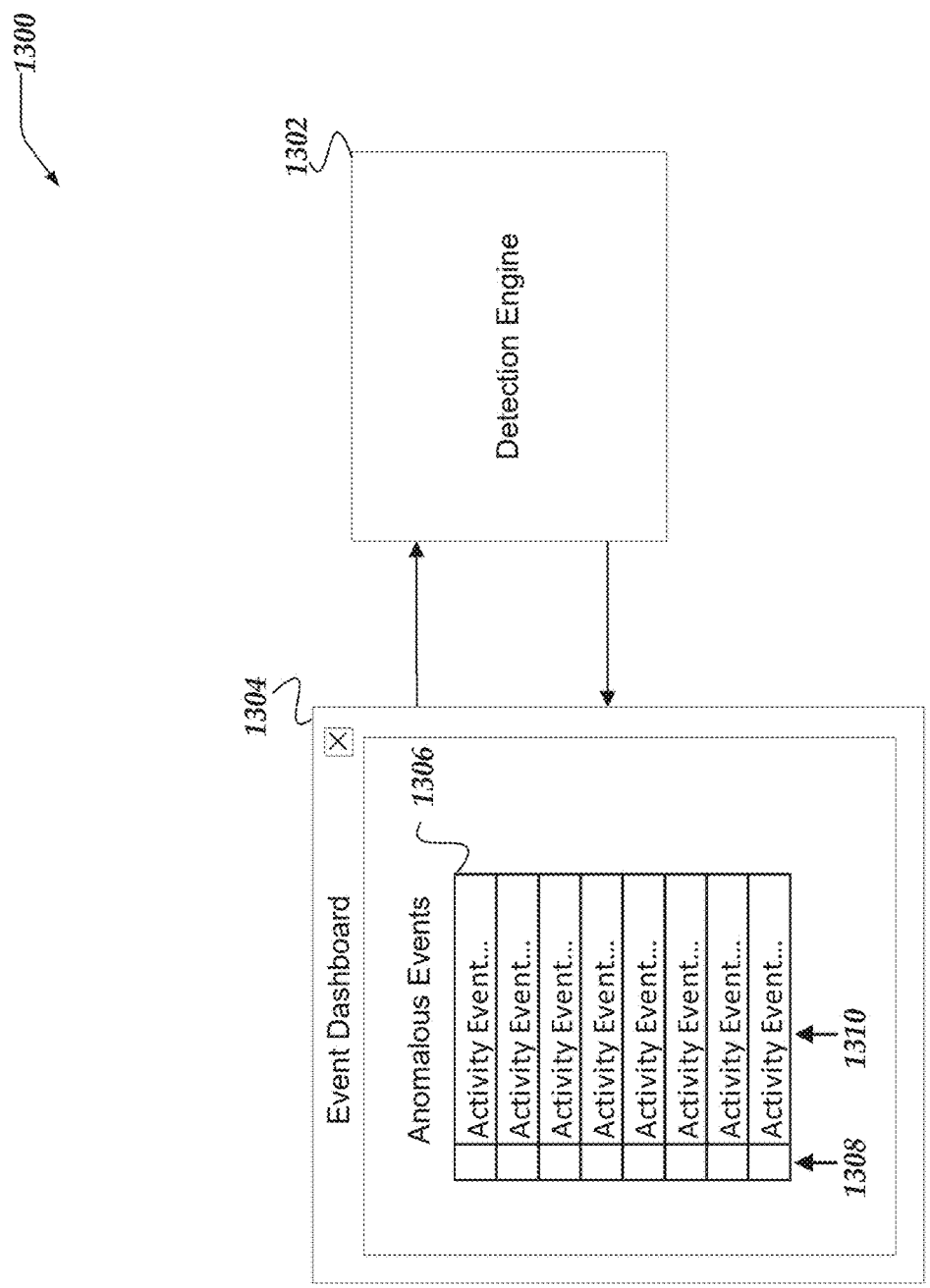
FIG. 13 illustrates a logical schematic of a system for anomaly detection in managed networks in accordance with one or more of the various embodiments.

FIG. 13 illustrates a logical schematic of system 1300 for anomaly detection in managed networks in accordance with one or more of the various embodiments. System 1300 may comprise various constituents, including: detection engine 1302; one or more client user interfaces, such as user interface 1304; or the like.

In some embodiments, detection engines may be arranged to provide one or more user interfaces such as user interface 1304. In some embodiments, user interfaces may include various windows, controls, or other user interface features. In some embodiments, user interfaces may include various user interface panels, such as panel 1306, or the like. For example, in some embodiments, panel 1306 may represent a user interface that enables users to review one or more activity events that may be reported as being anomalous activity events. Further, in some embodiments, panel 1306 may include columns, such as column 1308 or column 1310. In this example, for some embodiments, column 1308 may be considered to represent user interface controls the enable a user grade, validate, confirm, or reject predicted/display anomalous activity events. For example, in some embodiments, column 1308 may include controls such as check boxes, selection lists, fields for collecting feedback, buttons to display another user interface for providing additional feedback, or the like. Further, in this example, for some embodiments, column 1310 may be considered to represent interactive fields for viewing or interacting with the displayed anomalous activity events.

In some embodiments, detection engine 1302 may be arranged to generate or display user interface 1304 to users using one or more of video interface 242, projector 246, display 250, or the like, of a client computer, such as client computer 200. Also, in some embodiments, detection engine 1302 may be arranged to generate or display user interface 1302 to users using a one or more of input/output interface 338, display 350, audio interface 356, or the like, of a network computer, such as network computer 300.

In some embodiments, panel 1306 may be arranged to display a rank ordered list of anomalous activity events based on the various metrics, such as priority scores, confidence scores, or the like. Likewise, in some embodiments, ordering, grouping, emphasis styling, or the like may be based on resources, resource types, users, user types, actions, action types, applications, application types, or the like, associated with the reported anomalous activity events. Note, in some embodiments, one of ordinary skill in the art will appreciate that organizations may have significant control or influence over the particular ranking criteria. For example, in some cases, one or more resources may be considered more important than others. Accordingly, in some embodiments, some resources may be associated with different weights depending on the particular allowed actions, user type, resource type, or the like.

In some embodiments, for example, detection engines, infrastructure security computers, one or more client applications, or the like, may be arranged to generate one or more user interfaces that may dynamically be arranged to display one or more resources that are accessible to a user who may be declared in one or more queries communicated to a detection engine such that the listed activity events or anomalous activity events may be determined based on a response to the query.

Note, for brevity and clarity, this example describes an application that displays query results that include one or more anomalous activity events. However, one of ordinary skill in the art will appreciate the other types of queries or requests may be employed or information displayed. In some embodiments, detection engines may be enabled to provide results associated with particular types or categories of activity events.

In some embodiments, detection engines may be arranged to collect various telemetry or other metrics associated with user interactions with user interfaces. In some embodiments, telemetry may include tracking if users may be in agreement with the reported anomalous activity events, or the like. For example, if users commonly interact with anomalous activity events ranked lower than others, it may indicate that the metrics employed for ordering the anomalous activity events in panel 1306 may be deficient.

In one or more of the various embodiments, detection engines may be arranged to monitor telemetry information associated with one or more users of user interface 1304.

Accordingly, in some embodiments, detection engines may be arranged to provide one or more facilities to collect direct feedback from one or more users that may interact with one or more events displayed in panel 1306. For example, in some embodiments, user interfaces may include controls that enable authorized users to grade event ordering, event scoring, or other display features. Likewise, in some embodiments, a user interface may be provided to grade the event ranking. In this example, for some embodiments, column 1308 of interface may be considered to provide user interfaces that enable users to provide feedback regarding the displayed events. Also, in some embodiments, user interfaces in column 1308 may be employed to access or view additional information or perform various activities (e.g., mitigation actions) associated with the corresponding events in column 1310.

In some embodiments, grades or scores may be binary (e.g., like/dislike), discrete (e.g., one-four stars, letter grades), continuous values, or the like.

In some embodiments, telemetry information employed to monitor user preferences may be based on monitoring user interactions as well as direct feedback. Accordingly, in some embodiments, events (e.g., or associated resources, users, actions, or the like) that may be displayed but are ignored or discarded by users may be inferred to be poorly received. For example, for some embodiments, if the top ranked events determined by the detection engine, or the like, are ignored or lower ranked events draw more interaction by users, it may be inferred that there may be a problem with the ranking of the events for the current application.

Further, in some embodiments, detection engines may be arranged to receive telemetry information from other services or applications. Accordingly, in one or more of the various embodiments, detection engines are not required to directly monitor activity associated with the activity event, event reports, or the like. For example, for some embodiments, user interfaces may be displayed to users via desktop computer applications, mobile applications, web-based applications, or the like. In some embodiments, such applications may collect telemetry information and provide some or all of it to detection engines rather than requiring the detection engines to include monitoring facilities on user-side application.

Accordingly, in some embodiments, detection engine 1302 may be arranged to collect metrics or telemetry associated with user interactions with user interface 1304 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Also, in some embodiments, detection engine 1302 may be arranged to collect metrics or telemetry associated with user interactions with user interface 1304 using a one or more of input/output interface 338, GPS 340, keyboard 352, audio interface 356, pointing device interface 358, or the like, of a network computer, such as network computer 300.

In some embodiments, detection engines may be arranged to track mouse movement, eye movement, keystrokes, or the like, to determine how users may interact with information (e.g., events, event report, recommended responses, resources, actions, or the like) displayed in user interfaces. Accordingly, in some embodiments, detection engines may be arranged to evaluate at least the quality of various results, recommendations, or reports based on how users interface with them. For example, if users consistently select or otherwise favor events, resources, or actions ranked lower than others, it may indicate that one or more processes performing the ranking or matching may be experiencing diminished or diminishing effectiveness.

Likewise, it may indicate that one or more detection models may need retraining or reevaluation.

In some embodiments, detection engines may be arranged to associate a performance score with various anomaly determinations based on the user interaction metrics or telemetry. Accordingly, in some embodiments, if the performance score associated with anomaly determinations falls below a defined threshold value, detection engines may be arranged to suspend those particular one or more associated detection engine model or ranking processes from operation.

Also, in some embodiments, detection engines may be arranged to arrange, re-arrange or adapt user interfaces based on user telemetry or metrics associated with the one or more user interactions with the infrastructure security computer including content within the user interfaces. In some embodiments, user profiles may be configured to include user interface preferences based on collected metrics and user feedback. Accordingly, in some embodiments, detection engines may be arranged to select, position, size, highlight, or style one or more user interface components based on one or more of user interaction metrics and user feedback. For example, if users are tracked focusing on or navigating to particular user interface views, components, or user interface panels, detection engines may be arranged to highlight or size the preferred user interface elements or user interface panels. For example, if users are determined to rarely interact with a display panel such as display panel 1306, detection engines may be arranged to reduce the size and change the position of display panel 1306 by displaying a smaller sized version below display panel 1306 or increasing or decreasing the amount of event information shown in the panel. For example, by showing more or less event details.

Also, in some embodiments, detection engines may be arranged to adapt user interfaces based on the size/type of display, input methods, user status, or the like. For example, in some embodiments, if a user is determined to be operating using a mobile device, one or more user interface elements may be positioned differently. In some cases, for some embodiments, depending on the display type or display size, one or more user interface elements may be hidden from view.

Accordingly, in some embodiments, detection engines may be arranged to tangibly modify user interfaces, interactive reports, input collection, input selection, event lists, resource lists, anomaly reports, or the like, based on the efficient and effective performance of processes and/or activities associated with various types of activity event evaluation.

Generalized Operations

FIGS. 14-17 represent generalized operations for anomaly detection in managed networks in accordance with one or more of the various embodiments. In one or more of the various embodiments, processes 1400, 1500, 1600, and 1700 described in conjunction with FIGS. 14-17 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 14-17 may be used for anomaly detection in managed networks in aggregate in accordance with at least one of the various embodiments or architectures such as those described in conjunction with FIGS. 4-13 Further, in one or more of the various embodiments, some or all of the actions performed by processes 1400, 1500, 1600, and 1700 may be executed in part by infrastructure security engine 322, detection engine 326, one or more mesh agents, such as, mesh agent 324, or the like, running on one or more processors of one or more network computers.

Figure 14:
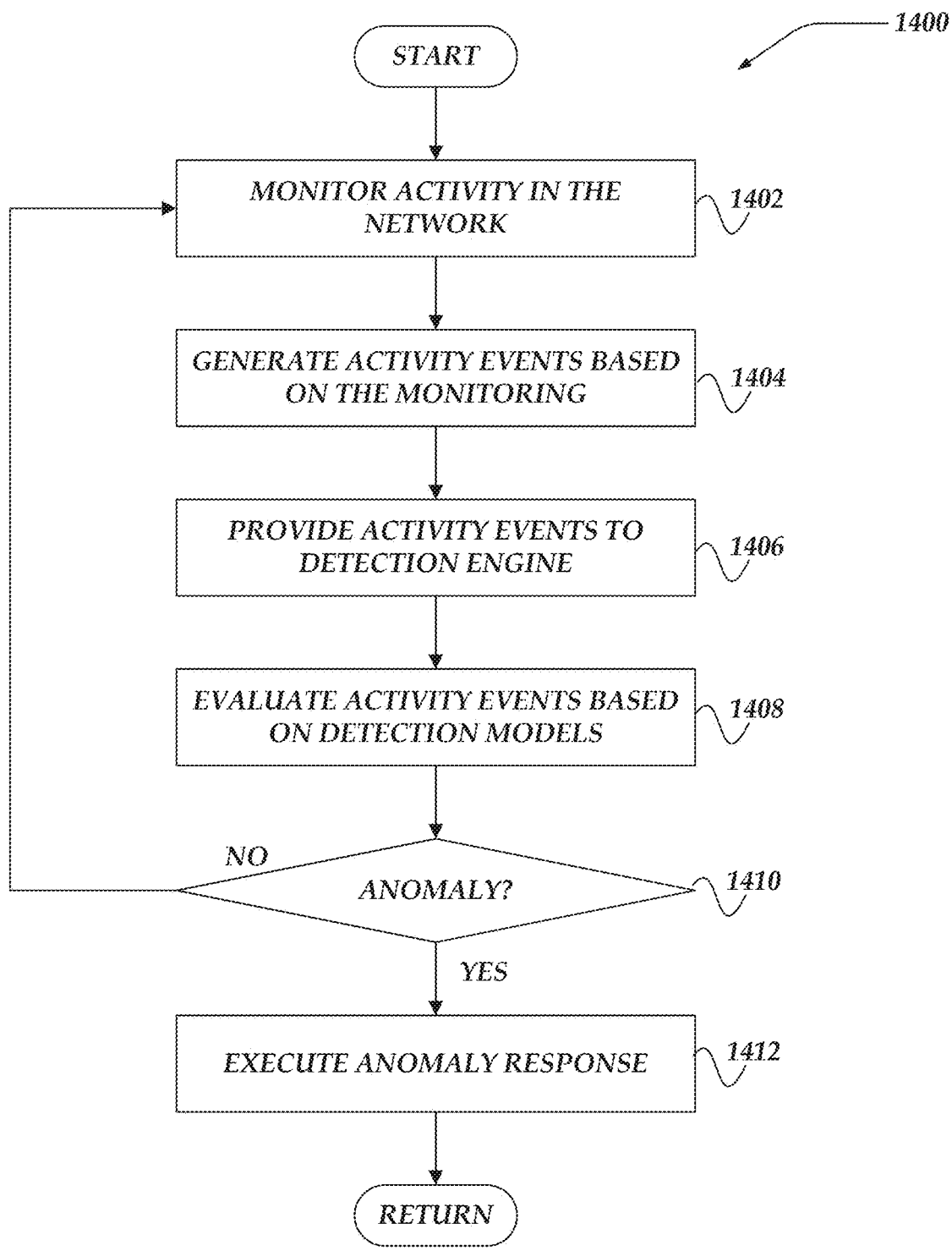
FIG. 14 illustrates an overview flowchart of a process for anomaly detection in managed networks in accordance with one or more of the various embodiments.

FIG. 14 illustrates an overview flowchart of process 1400 for anomaly detection in managed networks in accordance with one or more of the various embodiments. After a start block, at block 1402, in one or more of the various embodiments, activity in one or more networks may be monitored by one or more mesh agents, infrastructure security computer, or the like.

At block 1404, in one or more of the various embodiments, one or more of a mesh agent, an infrastructure security computer, or the like, may generate one or more activity events based on the monitoring of the network.

In some embodiments, activity events may be data structures that include information about the given activity. While the fields or field values of activity events may vary depending on the activity or organizations, it may be assumed that activity events include one or more fields or field values that describe various characteristics about the activity that may include effect entities, actions, context information, or the like, that may be collected by mesh agents, infrastructure security computers, or other monitoring services.

Also, in some embodiments, activity monitoring may be provided by other services or systems that may be configured to integrate with detection engines. For example, in some embodiments, a building management system or physical security system may be configured to submit activity events based on activities, such as doors opening/closing, fire alarms, motion detectors, HVAC metrics, or the like.

At block 1406, in one or more of the various embodiments, detection engines may be provided the one or more activity events.

As described above, in some embodiments, detection engine may be arranged to employ embedding engines to transform activity events into event vectors.

In some embodiments, detection engines may be arranged to receive activity event as a whole rather than selectively being provided particular fields. Accordingly, in some embodiments, embedding engines, or the like, may generate event vector that represent the whole activity event rather than selected fields or characteristics.

At block 1408, in one or more of the various embodiments, detection engines may be arranged to evaluate the activity events based on one or more detection models.

In some embodiments, detection engines may be arranged to evaluate activity events based on the event vectors that correspond to the activity events. Accordingly, in some embodiments, detection engines may be configured to use numerical methods or statistical methods to identify anomalous activity events from the event vectors.

In some embodiments, detection models may be trained to determine or predict if activity events may be anomalous based on their own criteria and the event vectors. Accordingly, in some embodiments, there may be one or more detection models that may be employed to evaluate the same event vector. In some embodiments, the one or more detection models may provide partial confidence scores, priority scores, or the like, that may be summed to provide totals. Likewise, in some embodiments, one or more detection models may be weighted such that some detection models may be considered more important than others.

At decision block 1410, in one or more of the various embodiments, if one or more activity events may be determined to be anomalous, control may flow to block 1412; otherwise, control may loop back to block 1402.

In some embodiments, detection engines may be arranged to be provided with a continuous stream of activity events such that anomaly detection may continue even though some activity events may be determined to anomalous. Accordingly, in some embodiments, information associated with the activity event determined to be anomalous may be passed to block 1412 while the main process continues evaluating incoming activity events for anomalies.

At block 1412, in one or more of the various embodiments, detection models may be arranged to generate one or more anomaly responses based on the one or more anomalous activity events.

As described, in some embodiments, detection engine may be arranged to generate one or more reports, notifications, alerts, log records, or the like to report or record the anomalous activity events.

In some embodiments, detection engines or other application may provide one or more user interfaces that enable users to view the determined anomalous activity events along with associated scores or weights. Also, in some embodiments, such user interfaces may be arranged to collect active or passive feedback information based on user interaction with the reported information. Accordingly, in some embodiments, such information may be employed to continuously evaluate the effectiveness of detection models that made the determinations.

Also, in some embodiments, detection engines or infrastructure security computer may be configured to perform one or more mitigation actions, such as terminating associated network connections, isolating entities that may be associated with anomalous activity events, routing associated traffic or subsequent activity to secure safe zones or honey pots, notifying law enforcement, or the like. Accordingly, in some embodiments, detection engines may be arranged to employ rules, instructions, or the like, provided via configuration information to determine the particular mitigation actions, if any, to account for local circumstance or local requirements.

Next, in one or more of the various embodiments, control may be returned to a calling process.

Figure 15:
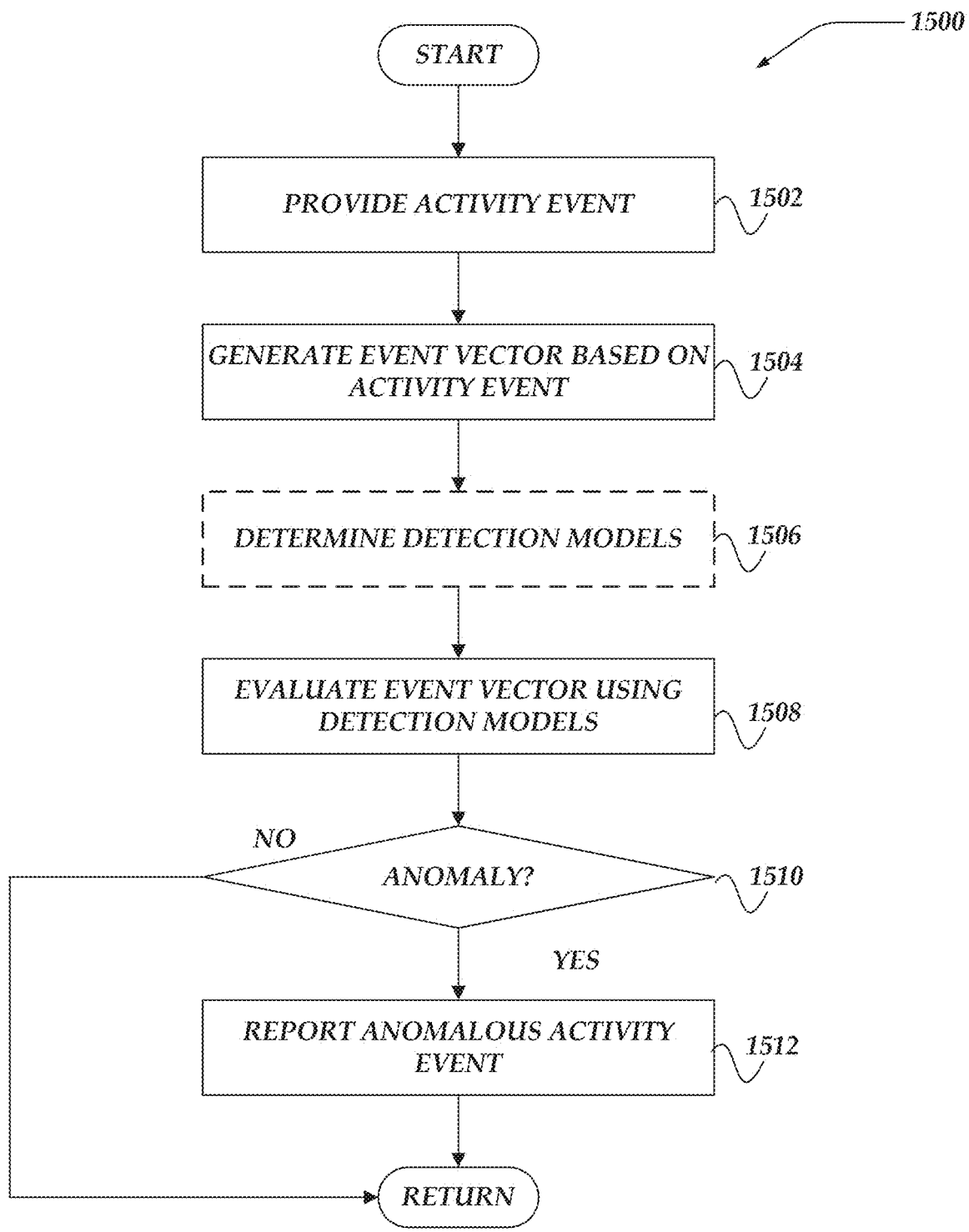
FIG. 15 illustrates a flowchart of a process for anomaly detection in managed networks in accordance with one or more of the various embodiments.

FIG. 15 illustrates a flowchart of process 1500 for anomaly detection in managed networks in accordance with one or more of the various embodiments. After a start block, at block 1502, in one or more of the various embodiments, detection engines may be arranged to be provided one or more activity events.

As described above, in some embodiments, activity events may be provided in the native or raw format as used by the mesh agents or infrastructure security computers in the managed network. For example, in some embodiments, activity events may include several fields associated with one or more of a user, a resource, an activity, context information, security policies, labels, natural language descriptions, application commands, command line arguments, or the like, that may be generated during the operation of the managed network. For example, in some embodiments, activity events may be arranged to provide users or administrators with sufficient information to determine relevant details regarding the activity.

Also, in some embodiments, the activity events provided to detection engines may not be modified, normalized, or the like before submitting to detection engines. Accordingly, in some embodiments, the detection models or detection engines may not be biased or distorted based on selective modifications to the activity events.

Further, in some cases, for some embodiments, activity events may be provided or generated by external systems rather than being limited to activity events generated internally or otherwise directly associated with mesh agents, infrastructure security computers, or the like. For example, in some embodiments, detection engines may be configured to receive events or alerts from other network monitoring systems.

At block 1504, in one or more of the various embodiments, detection engines may be arranged to generate event vectors for the one or more activity events.

As describe above, in some embodiments, detection engines may include embedding engines that generate event vectors from activity events. One of ordinary skill in the art will be familiar with embedding methods that generate multi-dimensional vectors from various inputs (text or otherwise) with each vector element represent as a real number. Accordingly, in some embodiments, by converting activity events into numerical event vectors, detection engines enable statistical or mathematical operations to be conducted on the event vectors.

In some embodiments, detection engines may be arranged to employ embedding engines that enable entire activity events to be provided absent pre-processing or pre-selection of one or more fields or features that may be included in the activity events. Accordingly, in some embodiments, results may avoid biasing or distortion that may be caused by selective feature selection. Thus, in some embodiments, rather than requiring a-priori selection (guessing) of important or meaningful features, detection engines may be arranged to generate event vectors based on the entire activity event.

In some embodiments, detection engines may be arranged to adaptable to changes or improvements in embedding technology. Accordingly, in some embodiments, detection engines may be arranged to select a particular embedding engine (or the configuration thereof) based on rules, instructions, libraries, or the like provided via configuration information. Further, in some embodiments, detection engines may be configured to employ embedding engines (e.g., services) that may be separate from the detection engines, mesh agents, or infrastructure security computers.

Further, in some embodiments, detection engines may be arranged to run more than one embedding engine in parallel such that results from different embedding engines may be compared to each other. For example, in some embodiments, a candidate embedding engine may be operated in parallel to an embedding engine being used in production. Thus, for example, if it may be discovered that it may be advantageous to employ the candidate embedding engine rather than the current embedding engine.

Further, in some embodiments, detection engines may be arranged to employ different embedding engines in different circumstances. For example, in some cases, by experiment, observation, or preference it may be determined that it may be advantageous to employ one embedding engine over another embedding engine. For example, in some embodiments, in some cases, it may be observed that using smaller event vectors with fewer elements or fewer dimensions may be sufficient for some organizations while reducing costs or improving one or more performance characteristics (e.g., compute time, memory consumption, processing speed, or the like) at the expense of reduced precision.

At block 1506, in one or more of the various embodiments, optionally, detection engines may be arranged to select one or more detection models.

In some embodiments, detection engines may be arranged to employ one or more detection models that may be trained for particular organizations, network types, activity event types, security goals/requirements, performance goals/requirements, or the like. Accordingly, in some embodiments, detection engines may be arranged to select one or more detection models based on one or more characteristics of one or more of the managed network environment, the host organization, the associated entities (e.g., users, user types, resources, resource types, actions, context information, or the like), the activity event type, or the like.

Note, this block is indicated as being optional because in some cases the detection model may be selected in advance or based on one or more defaulting rules or configuration.

At block 1508, in one or more of the various embodiments, detection engines may be arranged to evaluate the event vectors using one or more detection models.

As described above, there may be different types of detection models with different criteria for determining if a event vector represents anomalous activity. For example, in some embodiments, cluster based detection models may determine that an event vector may be associated with an anomalous activity event based on the distance between the event vector and the center of the detection model in the event space. Also, in some embodiments, detection models based on probability distributions may determine that an event vector may be associated with an anomalous activity event based on the deviation of the event vector from the expected distribution.

Further, in some embodiments, as described above, detection models may be associated with confidence score values, priority score values, or the like, that may be associated with anomaly determinations. Accordingly, in some embodiments, detection engine may be arranged to associate one or more scores or weights with each anomaly determination. In some embodiments, if multiple detection models may be employed, their scores may be considered partial scores that may be summed up to provide a final tally that may be associated with the anomalous activity event.

At decision block 1510, in one or more of the various embodiments, if one or more activity events may be determined to be anomalous, control may flow to block 1512; otherwise, control may be returned to a calling process.

As described above, in some embodiments, detection models may be configured to include criteria for determining if activity events may be anomalous. In some embodiments, detection engines may be arranged to determine if activity events may be anomalous based on their confidence score or priority score exceeding one or more defined threshold values. In some embodiments, different threshold values may be assigned to different types of activity events or effected/related entities or activities. For example, in some embodiments, if an activity event may be associated with a sensitive resource, the threshold value for determining if it may be anomalous may be lower than for other activity events that may be associated with less sensitive resources. Likewise, in some embodiments, activity events may be associated with one or more security policies. Accordingly, in some embodiments, threshold values may be associated with the security policies that may be implicated by the activity events.

At block 1512, in one or more of the various embodiments, detection engines may be arranged to generate one or more reports associated with the one or more anomalous activity events.

In some embodiments, generally, detection engines may be arranged to raise alerts, send notifications, generate log records, or the like. Also, in some embodiments, detection engine may be arranged to generate one or more user interfaces that enable interactive reports regarding activity events to be reviewed by users or administrators.

In some embodiments, detection engines may be arranged to provide anomalous activity events reports to other services, such as security information and event management (SIEM) systems, AI agents, trouble ticketing systems, or the like that may be configured to receive anomalous activity event reports.

In some embodiments, anomalous activity events reports may include interactive user interfaces that enable users to drill down into the details of the associated activity events, associated security policies, associated entities, or the like. In some embodiments, interactive reports may be monitored to collect metrics regarding how users may interact with the reports.

Next, in one or more of the various embodiments, control may be returned to a calling process.

Figure 16:
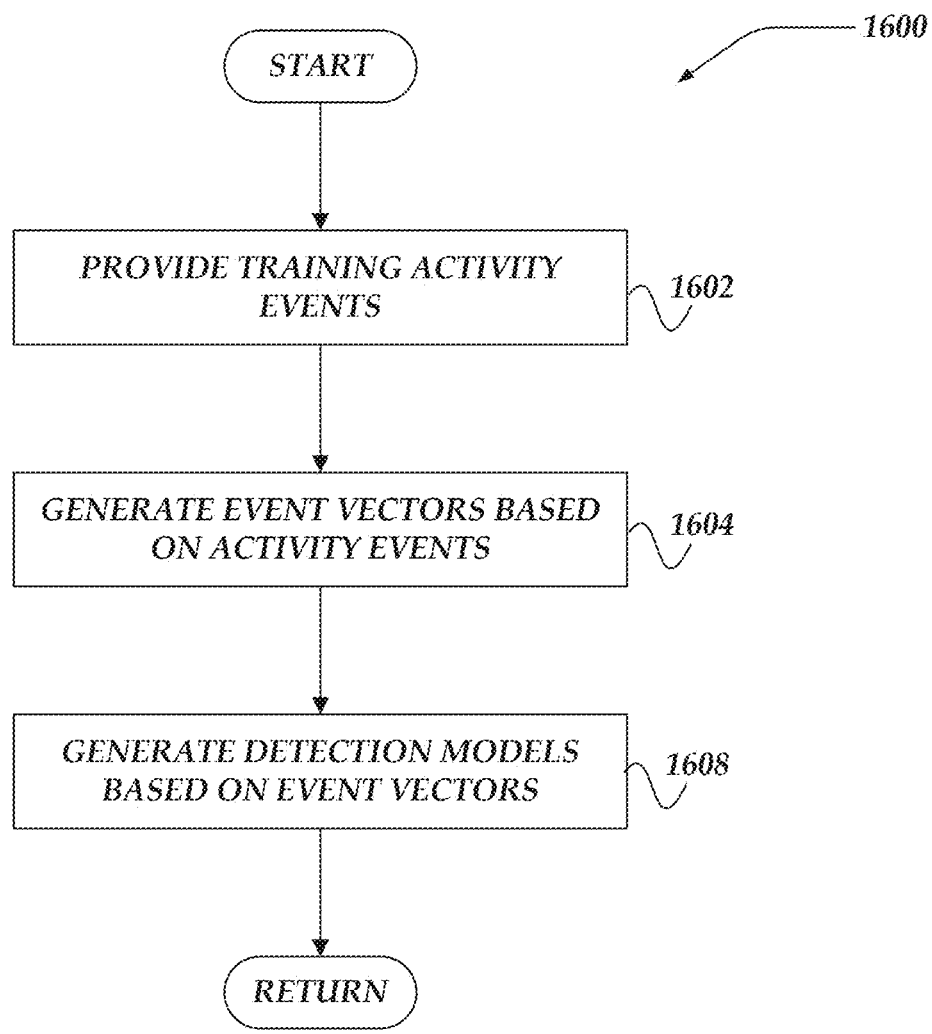
FIG. 16 illustrates a flowchart of a process for anomaly detection in managed networks in accordance with one or more of the various embodiments.

FIG. 16 illustrates a flowchart of process 1600 for anomaly detection in managed networks in accordance with one or more of the various embodiments. After a start block, at block 1602, in one or more of the various embodiments, detection engines may be arranged to be provided one or more activity events for training detection models.

As described above, in some embodiments, detection engines may be arranged to train detection models based on archived activity events or synthetic activity events. Accordingly, in some embodiments, detection engines may be arranged to be provided training activity events streamed from data stores of archived activity events or from a synthetic activity event generator.

One of ordinary skill in the art will be familiar with methods for generating synthetic activity events. For example, in some embodiments, programs, scripts, or the like, may be configured to generate synthetic activity events that conform to one or more training goals. Also, in some embodiments, detection engines may be arranged to employ generative AI models to generate synthetic activity events. Further, in some cases, for some embodiments, synthetic activity events may be based off archived events that may be modified for a particular training.

In some embodiments, training goals may include one or more of detecting general anomalies, detecting anomalies associated with one or more entities (e.g., user types, resources, resource types, application types, applications, or the like), detecting anomalies associated with particular activities (e.g., database access, file transfers, or the like), detecting anomalies associated with other context associated with activities (e.g., geographic location, network addresses, time-of-day, or the like). or the like.

Also, in some embodiments, training activity events may be sampled from live activity events that may be occurring in a managed network. Accordingly, in some embodiments, detection engines may be arranged to train detection models alongside the operation of production detection models. Thus, in some embodiments, the performance of candidate detection models may be evaluated or compared to the current detection models.

At block 1604, in one or more of the various embodiments, detection engines may be arranged to generate one or more event vectors based on the activity events. As described above, activity events, including training activity events may be provided to embedding engines that generate event vectors from the activity events.

In some embodiments, detection engines may be configured to store event vectors for particular training runs to enable them to be replayed as necessary.

At block 1606, in one or more of the various embodiments, detection engines may be arranged to generate one or more detection models based on the one or more event vectors. As described above, in some embodiments, training detection models may include observing where event vectors may land or appear in multi-dimensional event space.

Accordingly, in some embodiments, detection engines or modeling engines may be arranged to generate detection models based on how event vectors may be distributed in the event. As described above, in some embodiments, detection models may be based on various strategies, including clustering, grouping, probability distributions, or the like. Further, in some embodiments, detection model training may include determining distances, threshold values, or the like, that may be employed to determine if an event vector may correspond to an anomalous activity event.

Next, in one or more of the various embodiments, control may be returned to a calling process.

Figure 17:
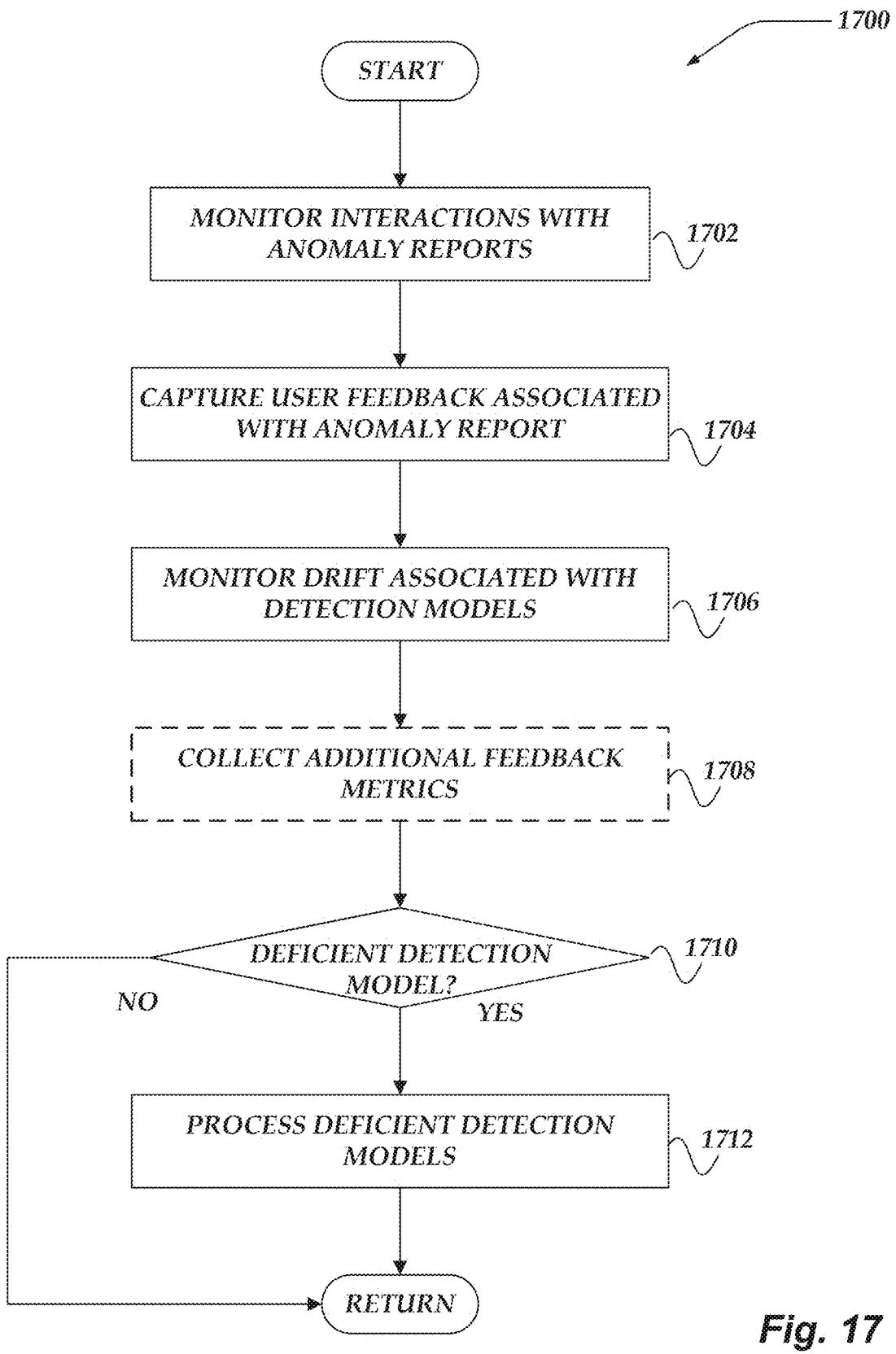
FIG. 17 illustrates a flowchart of a process for anomaly detection in managed networks in accordance with one or more of the various embodiments.

FIG. 17 illustrates a flowchart of process 1700 for anomaly detection in managed networks in accordance with one or more of the various embodiments. After a start block, at block 1702, in one or more of the various embodiments, detection engines may be configured to monitor one or more interactions with anomaly reports. As described above, in some embodiments, detection engines may be arranged to provide one or more user interfaces that enable users or administrators to view anomalous activity events. In some embodiments, these reports may be considered to be interactive reports that may enable users to perform various actions, including drilling down into the details of the activity events, filtering or sorting anomalous events based on various attributes or characteristics associated with the activity events, grading or scoring the identification of the anomalous activity events, or the like.

In some embodiments, detection engines may be arranged to enable users to modify or design reports based on the various fields associated with the anomalous activity events. For example, in some embodiments, detection engines may be arranged to enable anomalous activity events to be sorted, grouped, or filtered based on one or more of a user, resource, actions, activity, or other event context information that may include geographic location, network addresses, time-of-day, or the like.

In some embodiments, detection engines may be arranged to provide anomalous activity events or associated information to other applications via one or more APIs or interfaces. Accordingly, in some embodiments, these applications may be enabled to provide the user interface for the interactive reports. In some embodiments, these applications may submit interaction metrics to the detection engines via the same or similar APIs or interfaces. However, for brevity or clarity descriptions of user interfaces, interaction monitoring, or the like will be described as being provided by detection engines even though other applications may be supported by APIs, interfaces, or other integrations. For example, in some embodiments, infrastructure security computers may provide the user interfaces for anomalous activity events, or the like.

At block 1704, in one or more of the various embodiments, detection engines may be arranged to collect user feedback associated one or more anomaly reports.

As described above, in some embodiments, detection engines may be arranged to provide user interfaces that enable users to provide direct feedback regarding their perceived quality of the identified anomalous activity events. In some embodiments, user interfaces may provide controls that enable users to confirm if the determined anomalous activity events may be considered anomalous. Likewise, in some embodiments, user interfaces may enable users to provide direct feedback regarding priority scores, confidence scores, or the like, that may be associated with anomalous activity events.

Also, in some embodiments, detection engines may be arranged to provide user interfaces that enable users to submit natural language feedback regarding the determination of anomalous activity events, the quality of reports, the quality of recommended mitigation actions (if any), or the like. Accordingly, in some embodiments, detection engines may be arranged to employ natural language processing (NLP), large language models, or the like to evaluate the semantics or sentiment associated with the natural language feedback. Thus, in some embodiments, detection engines may be arranged to determine positive or negative feedback from the submitted natural language feedback.

At block 1706, in one or more of the various embodiments, detection engines may be arranged to monitor drift that may be associated with one or more detection models.

In some embodiments, detection engines may be arranged to evaluate if one or more detection models have become less effective based on observing how well they may reflect the current operational realities of the managed environment. In some embodiments, detection engines may be arranged to collect one or more metrics associated with the historical performance of detection models. For example, in some embodiments, if a particular detection model that used to identify 1/1000 of activity events as anomalous, begins consistently and inexplicably to identify more or less activity events as anomalous. Absent other considerations, it may indicate that the detection model may be out of sync with the current normal operations within the network. For example, if an organization assigns users to different tasks, opens a geographically distance worksite, or makes other legitimate operations changes, one or more detection models trained using older activity events may begin reporting anomalous activity where there is none. Thus, in some embodiments, detection models exhibiting this behavior may be considered to suffer from model drift.

Accordingly, in some embodiments, detection engines may be arranged to apply one or more tests to evaluate if detection models may be exhibiting drift. For example, if the change in determining anomalous activity events may be associated with other indications of false positives (e.g., negative user feedback), the associated detection models may be indicated as exhibiting drift. Note, the particular heuristics, conditions, or threshold values for determining if detection models may be drifting may be provided via configuration information to account for local circumstances of local requirements.

At block 1708, in one or more of the various embodiments, optionally, detection engines may be arranged to collect additional feedback metrics.

In some embodiments, detection engines may be arranged to be adaptable such that additional feedback metrics may be collected. Accordingly, in some embodiments, detection engines may be arranged to employ rules, instructions, software libraries, or the like for determining the additional feedback metrics via configuration information to account for local circumstances or local requirements.

For example, in some embodiments, additional feedback metrics may be associated with particular types of anomalous activity events such as those directed to particular resources or user types. Likewise, in some embodiments, additional feedback metrics may be associated with particular detection models. For example, in some embodiments, detection models considered experimental may be associated with additional feedback metrics to evaluate if those detection models may be suitable for employing in general production.

Note, this block is indicated as being optional because in some cases detection engines may not collect additional feedback metrics.

At decision block 1710, in one or more of the various embodiments, if one or more detection models may be determined to be deficient, control may flow to block 1712; otherwise, control may be returned to a calling process.

In some embodiments, detection engines may be arranged to determine detection models may be deficient based on the various feedback metrics discussed above. In some embodiments, detection engines may be arranged to employ one or more formulas, heuristics, conditions, threshold values, or the like for determining if detection models may be deficient based on the associated feedback metrics. In some embodiments, different types of feedback may be weighted more or less than others. For example, direct user feedback such as rejecting determinations that particular activity events may be anomalous may be configured to have more weight than passive feedback associated with user interactions with anomalous activity event reports.

At block 1710, in one or more of the various embodiments, detection engines may be arranged to process the one or more deficient detection models.

In some embodiments, detection engines may be configured to perform various actions in response to the determination of deficient detection models. For example, in some embodiments, deficient detection models may be discarded and pulled from production. Also, in some embodiments, detection engines may be arranged to automatically designate deficient detection models for automatic retraining. Further, in some embodiments, detection engines may be arranged to suspend deficient detection models from use such that an administrator may be notified of the deficient detection models.

In some embodiments, detection engines may be arranged to generate user interfaces that include reports regarding a current performance score for detection models. Accordingly, in some embodiments, detection engines may be arranged to enable administrators to identify detection models that may be degrading before the may be determined to be deficient.

Next, in one or more of the various embodiments, control may be returned to a calling process.

It will be understood that each block of the flowchart illustrations or combinations of blocks in these flowchart illustrations, may be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring interactions with applications in a computing environment using one or more processors that are configured to execute instructions that cause performance of actions, comprising:
    obtaining one or more events based on an activity that is observed in a monitored network, wherein each event includes one or more values associated with the activity;
    embedding one or more high dimensional event vectors based on the one or more events and the one or more values included for each event;
    collecting one or more anomalous events based on one or more detection models trained with a cluster of events associated with the one or more high dimensional event vectors, wherein each anomalous event corresponds to a high dimensional event vector compared to one or more conditions declared in the one or more detection models, and wherein each anomalous event is associated with one or more of a priority score or a confidence score;
    collecting each detection model that exhibits model drift based on one or more false positives for one or more tests applied to the one or more detection models, wherein each model drifted detection model is removed from performing collection of the one or more anomalous events; and
    obtaining a user interface for a display panel that displays a report that includes the one or more anomalous events and event information based on one or more of the priority score, the confidence score, a user selected preference, or one or more feedback metrics associated with the user interface, wherein an arrangement of the display panel and the display of the report are dynamically transformed for viewing by a user based on one or more of user interactions with the display panel.

2. The method of claim 1, wherein collecting the one or more anomalous events, further comprises:
    collecting one or more metrics that exceed a threshold value provided by a detection model based on the one or more high dimensional event vectors and one or more of a distance from a center of the detection model, a deviation from a probability curve provided by the detection model, or a similarity to a vector provided by the detection model and the high dimensional event vector; and
    collecting the one or more anomalous events based on a portion of the one or more high dimensional event vectors associated with the one or more metrics that exceeded the one or more threshold values.

3. The method of claim 1, further comprising:
    collecting one or more training events based on one or more of an archive of one or more historical events or one or more synthetic events;
    obtaining one or more training high dimensional event vectors based on the one or more training events; and
    obtaining the one or more detection models based on the one or more training high dimensional event vectors.

4. The method of claim 1, further comprising:
    collecting one or more deficient detection models based on the one or more feedback metrics associated with the report, wherein the one or more feedback metrics indicate an ineffective collection of the one or more anomalous events; and
    retraining the one or more deficient detection models based on one or more other events, wherein the one or more retrained detection models collect one or more other anomalous events.

5. The method of claim 1, further comprising:
    categorizing one or more training events based on one or more categories associated with one or more activity features, wherein the one or more activity features include one or more of an associated user, an associated user type, an associated resource, an associated resource type, an associated application, an associated application type, a geographic location, a time of day, a day of week, a time window, or an associated application command;
    obtaining a portion of the one or more detection models based on the one or more categorized training events, wherein the portion of the one or more detection models are associated with the one or more categories; and
    collecting one or more portions of the one or more anomalous events associated with the one or more categories based on the portion of one or more detection models and the one or more high dimensional event vectors.

6. The method of claim 1, wherein collecting the one or more anomalous events based on the one or more detection models, further comprises:
    collecting one or more other detection models that are included as sub-models of the one or more detection models based on the one or more detection models; and
    comparing the one or more high dimensional event vectors to the one or more other detection models to collect the one or more anomalous events.

7. The method of claim 1, wherein collecting the one or more anomalous events based on the one or more detection models, further comprises:
    obtaining two or more detection models to evaluate the one or more high dimensional event vectors; and collecting the one or more anomalous events based on a comparison of the two or more evaluations, wherein one or more differences in the evaluations indicate an anomalous event.

8. The method of claim 1, wherein collecting the one or more anomalous events based on the one or more detection models, further comprises:
   collecting the one or more detection models associated with the one or more anomalous events, wherein each of the one or more detection models is associated with one or more partial priority scores, and wherein each of the one or more detection models is associated with one or more partial confidence scores;
   collecting a final priority score for each anomalous event based on a sum of the one or more partial priority scores; and
   collecting a final confidence score for each anomalous event based on a sum of the one or more partial confidence scores.

9. A network computer for managing interactions with applications, comprising:
   a memory that stores at least instructions; and
   one or more processors that execute instructions that are configured to cause actions, including:
      obtaining one or more events based on an activity that is observed in a monitored network, wherein each event includes one or more values associated with the activity;
      embedding one or more high dimensional event vectors based on the one or more events and the one or more values included for each event;
      collecting one or more anomalous events based on one or more detection models trained with a cluster of events associated with the one or more high dimensional event vectors, wherein each anomalous event corresponds to a high dimensional event vector compared to one or more conditions declared in the one or more detection models, and wherein each anomalous event is associated with one or more of a priority score or a confidence score;
      collecting each detection model that exhibits model drift based on one or more false positives for one or more tests applied to the one or more detection models, wherein each model drifted detection model is removed from performing collection of the one or more anomalous events; and
      obtaining a user interface for a display panel that displays a report that includes the one or more anomalous events and event information based on one or more of the priority score, the confidence score, a user selected preference, or one or more feedback metrics associated with the user interface, wherein an arrangement of the display panel and the display of the report are dynamically transformed for viewing by a user based on one or more of user interactions with the display panel.

10. The network computer of claim 9, wherein collecting the one or more anomalous events, further comprises:
    collecting one or more metrics that exceed a threshold value provided by a detection model based on the one or more high dimensional event vectors and one or more of a distance from a center of the detection model, a deviation from a probability curve provided by the detection model, or a similarity to a vector provided by the detection model and the high dimensional event vector; and
    collecting the one or more anomalous events based on a portion of the one or more high dimensional event vectors associated with the one or more metrics that exceeded the one or more threshold values.

11. The network computer of claim 9, wherein the one or more processors execute instructions that are configured to cause actions, further comprising:
    collecting one or more training events based on one or more of an archive of one or more historical events or one or more synthetic events;
    obtaining one or more training high dimensional event vectors based on the one or more training events; and
    obtaining the one or more detection models based on the one or more training high dimensional event vectors.

12. The network computer of claim 9, wherein the one or more processors execute instructions that are configured to cause actions, further comprising:
    collecting one or more deficient detection models based on the one or more feedback metrics associated with the report, wherein the one or more feedback metrics indicate an ineffective collection of the one or more anomalous events; and
    retraining the one or more deficient detection models based on one or more other events; wherein the one or more retrained detection models collect one or more other anomalous events.

13. The network computer of claim 9, wherein the one or more processors execute instructions that are configured to cause actions, further comprising:
    categorizing one or more training events based on one or more categories associated with one or more activity features, wherein the one or more activity features include one or more of an associated user, an associated user type, an associated resource, an associated resource type, an associated application, an associated application type, a geographic location, a time of day, a day of week, a time window, or an associated application command;
    obtaining a portion of the one or more detection models based on the one or more categorized training events, wherein the portion of the one or more detection models are associated with the one or more categories; and
    collecting one or more portions of the one or more anomalous events associated with the one or more categories based on the portion of one or more detection models and the one or more high dimensional event vectors.

14. The network computer of claim 9, wherein collecting the one or more anomalous events based on the one or more detection models, further comprises:
    collecting one or more other detection models that are included as sub-models of the one or more detection models based on the one or more detection models; and
    comparing the one or more high dimensional event vectors to the one or more other detection models to collect the one or more anomalous events.

15. The network computer of claim 9, wherein collecting the one or more anomalous events based on the one or more detection models, further comprises:
    employing two or more detection models to evaluate the one or more high dimensional event vectors; and
    collecting the one or more anomalous events based on a comparison of the two or more evaluations, wherein one or more differences in the evaluations indicate an anomalous event.

16. A processor readable non-transitory storage media that includes instructions configured for managing interactions with applications in a computing environment, wherein execution of the instructions by one or more processors on one or more network computers causes performance of actions, comprising:
- obtaining one or more events based on an activity that is observed in a monitored network, wherein each event includes one or more values associated with the activity;
- embedding one or more high dimensional event vectors based on the one or more events and the one or more values included for each event;
- collecting one or more anomalous events based on one or more detection models trained with a cluster of events associated with the one or more high dimensional event vectors, wherein each anomalous event corresponds to a high dimensional event vector compared to one or more conditions declared in the one or more detection models, and wherein each anomalous event is associated with one or more of a priority score or a confidence score;
- collecting each detection model that exhibits model drift based on one or more false positives for one or more tests applied to the one or more detection models, wherein each model drifted detection model is removed from performing collection of the one or more anomalous events; and
- obtaining a user interface for a display panel that displays a report that includes the one or more anomalous events and event information based on one or more of the priority score, the confidence score, a user selected preference, or one or more feedback metrics associated with the user interface, wherein an arrangement of the display panel and the display of the report are dynamically transformed for viewing by a user based on one or more of user interactions with the display panel.

17. The media of claim 16, wherein collecting the one or more anomalous events, further comprises:
- collecting one or more metrics that exceed a threshold value provided by a detection model based on the one or more high dimensional event vectors and one or more of a distance from a center of the detection model, a deviation from a probability curve provided by the detection model, or a similarity to a vector provided by the detection model and the high dimensional event vector; and
- collecting the one or more anomalous events based on a portion of the one or more high dimensional event vectors associated with the one or more metrics that exceeded the one or more threshold values.

18. The media of claim 16, further comprising:
- collecting one or more training events based on one or more of an archive of one or more historical events or one or more synthetic events;
- obtaining one or more training high dimensional event vectors based on the one or more training events; and
- obtaining the one or more detection models based on the one or more training high dimensional event vectors.

19. The media of claim 16, further comprising:
- collecting one or more deficient detection models based on the one or more feedback metrics associated with the report, wherein the one or more feedback metrics indicate an ineffective collection of the one or more anomalous events; and
- retraining the one or more deficient detection models based on one or more other events, wherein the one or more retrained detection models collect one or more other anomalous events.

20. The media of claim 16, further comprising:
- categorizing one or more training events based on one or more categories associated with one or more activity features, wherein the one or more activity features include one or more of an associated user, an associated user type, an associated resource, an associated resource type, an associated application, an associated application type, a geographic location, a time of day, a day of week, a time window, or an associated application command;
- obtaining a portion of the one or more detection models based on the one or more categorized training events, wherein the portion of the one or more detection models are associated with the one or more categories; and
- collecting one or more portions of the one or more anomalous events associated with the one or more categories based on the portion of one or more detection models and the one or more high dimensional event vectors.

21. The media of claim 16, wherein collecting the one or more anomalous events based on the one or more detection models, further comprises:
- collecting one or more other detection models that are included as sub-models of the one or more detection models based on the one or more detection models; and
- comparing the one or more high dimensional event vectors to the one or more other detection models to collect the one or more anomalous events.

22. The media of claim 16, wherein collecting the one or more anomalous events based on the one or more detection models, further comprises:
- employing two or more detection models to evaluate the one or more high dimensional event vectors; and
- collecting the one or more anomalous events based on a comparison of the two or more evaluations, wherein one or more differences in the evaluations indicate an anomalous event.

23. A system for method for managing interactions with applications, comprising:
- a network computer, comprising:
  - a memory that stores at least instructions; and
  - one or more processors that execute instructions that are configured to cause actions, including:
    - obtaining one or more events based on an activity that is observed in a monitored network, wherein each event includes one or more values associated with the activity;
    - embedding one or more high dimensional event vectors based on the one or more events and the one or more values included for each event;
    - collecting one or more anomalous events based on one or more detection models trained with a cluster of events associated with the one or more high dimensional event vectors, wherein each anomalous event corresponds to a high dimensional event vector compared to one or more conditions declared in the one or more detection models, and wherein each anomalous event is associated with one or more of a priority score or a confidence score;
    - collecting each detection model that exhibits model drift based on one or more false positives for one or more tests applied to the one or more detection models, wherein each model drifted detection model is removed from performing collection of the one or more anomalous events; and obtaining a user interface for a display panel that displays a report that includes the one or more anomalous events and event information based on one or more of the priority score, the confidence score, a user selected preference, or one or more feedback metrics associated with the user interface, wherein an arrangement of the display panel and the display of the report are dynamically transformed for viewing by a user based on one or more of user interactions with the display panel; and a client computer, comprising:
another memory that stores at least instructions; and
one or more other processors that execute other instructions that are configured to cause actions, including:
communicating information associated with the observed activity to the network computer.

24. The system of claim 23, wherein collecting the one or more anomalous events, further comprises:
collecting one or more metrics that exceed a threshold value provided by a detection model based on the one or more high dimensional event vectors and one or more of a distance from a center of the detection model, a deviation from a probability curve provided by the detection model, or a similarity to a vector provided by the detection model and the high dimensional event vector; and
collecting the one or more anomalous events based on a portion of the one or more high dimensional event vectors associated with the one or more metrics that exceeded the one or more threshold values.

25. The system of claim 23, wherein the one or more processors of the network computer execute instructions that are configured to cause actions, further comprising:
collecting one or more training events based on one or more of an archive of one or more historical events or one or more synthetic events;
obtaining one or more training high dimensional event vectors based on the one or more training events; and
obtaining the one or more detection models based on the one or more training high dimensional event vectors.

26. The system of claim 23, wherein the one or more processors of the network computer execute instructions that are configured to cause actions, further comprising:
collecting one or more deficient detection models based on the one or more feedback metrics associated with the report, wherein the one or more feedback metrics indicate an ineffective collection of the one or more anomalous events; and
retraining the one or more deficient detection models based on one or more other events, wherein the one or more retrained detection models collect one or more other anomalous events.

27. The system of claim 23, wherein the one or more processors of the network computer execute instructions that are configured to cause actions, further comprising:
categorizing one or more training events based on one or more categories associated with one or more activity features, wherein the one or more activity features include one or more of an associated user, an associated user type, an associated resource, an associated resource type, an associated application, an associated application type, a geographic location, a time of day, a day of week, a time window, or an associated application command;
obtaining a portion of the one or more detection models based on the one or more categorized training events, wherein the portion of the one or more detection models are associated with the one or more categories; and
collecting one or more portions of the one or more anomalous events associated with the one or more categories based on the portion of one or more detection models and the one or more high dimensional event vectors.

28. The system of claim 23, wherein collecting the one or more anomalous events based on the one or more detection models, further comprises:
collecting one or more other detection models that are included as sub-models of the one or more detection models based on the one or more detection models; and
comparing the one or more high dimensional event vectors to the one or more other detection models to collect the one or more anomalous events.

29. The system of claim 23, wherein collecting the one or more anomalous events based on the one or more detection models, further comprises:
employing two or more detection models to evaluate the one or more high dimensional event vectors; and
collecting the one or more anomalous events based on a comparison of the two or more evaluations, wherein one or more differences in the evaluations indicate an anomalous event.

30. The system of claim 23, wherein collecting the one or more anomalous events based on the one or more detection models, further comprises:
collecting the one or more detection models associated with the one or more anomalous events, wherein each of the one or more detection models is associated with one or more partial priority scores, and wherein each of the one or more detection models is associated with one or more partial confidence scores;
collecting a final priority score for each anomalous event based on a sum of the one or more partial priority scores; and
collecting a final confidence score for each anomalous event based on a sum of the one or more partial confidence scores.

* * * * *